United States Patent
Goldsmith et al.

(10) Patent No.: US 9,411,508 B2
(45) Date of Patent: Aug. 9, 2016

(54) CONTINUOUS HANDWRITING UI

(71) Applicant: Apple Inc., Cupertino, CA (US)

(72) Inventors: Deborah E. Goldsmith, Los Gatos, CA (US); Karan Misra, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/501,877

(22) Filed: Sep. 30, 2014

(65) Prior Publication Data

US 2015/0193141 A1    Jul. 9, 2015

Related U.S. Application Data

(60) Provisional application No. 61/923,577, filed on Jan. 3, 2014.

(51) Int. Cl.
*G06F 3/0488* (2013.01)
*G06K 9/22* (2006.01)

(52) U.S. Cl.
CPC .............. *G06F 3/04883* (2013.01); *G06K 9/22* (2013.01); *G06K 9/222* (2013.01); *G06F 2203/04803* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,502,017 B1* | 3/2009 | Ratzlaff | ............ | G06F 3/04883 345/173 |
| 8,094,941 B1* | 1/2012 | Rowley | ............ | G06F 3/04883 382/186 |
| 2003/0185444 A1* | 10/2003 | Honda | ............ | G06K 9/222 382/186 |
| 2012/0216141 A1* | 8/2012 | Li | ............ | G06K 9/00416 715/780 |
| 2015/0067504 A1* | 3/2015 | Kim | ............ | G06F 3/0482 715/708 |

* cited by examiner

*Primary Examiner* — Amr Awad
*Assistant Examiner* — Donna Lui
(74) *Attorney, Agent, or Firm* — Morgan, Lewis & Bockius LLP

(57) ABSTRACT

Some embodiments provide a touch-sensitive device that includes a handwriting area for receiving a handwritten input and a text area for displaying text characters that have been recognized for the handwritten input. As the device receives a subsequent handwritten input, it continuously removes portions of previously handwritten input from the handwriting area in order to allow the user to continue to provide handwritten input without having to clear the handwriting area. Some embodiments apply a fading mechanism for removing the handwritten input from the handwriting area. Different embodiments apply different factors for determining when and how to remove handwritten input from the handwriting area, including character based, word base, location based, and timer based thresholds.

23 Claims, 24 Drawing Sheets

CONTINUOUS HANDWRITING UI

BACKGROUND

With the proliferation of computing devices such as smartphones, tablets, laptops, and desktops, users are enjoying numerous different mechanisms and interfaces for inputting text, including standard keyboards, virtual keyboards, voice recognition applications, and touch-sensitive input areas. Devices that include such touch-sensitive input areas are able to receive handwriting input from a user, which is then recognized by the device as corresponding to text characters. Furthermore, after a user has input several characters in the handwriting area such that the user is unable to input additional characters, the user has to perform a variety of different clearing operations to clear the handwriting area in order to be able to continue to provide input in the handwriting area. These clearing operations can significantly slow down a user when the user is inputting text to an application executing on the device.

BRIEF SUMMARY

Some embodiments of the invention provide a device (e.g., mobile device such as a smartphone or tablet, desktop, laptop, etc.) that receives handwriting input in a handwriting area and displays recognized text for the input in a text area of the device. In some embodiments, the device displays the text area and the handwriting area on the touch sensitive display of the device. In some embodiments, the handwriting area and the text area may be the same area (for example, a user can handwrite in an area and the input is recognized as text within the same area). The text area can be any area where text input can be displayed, e.g., a note-taking application, an email application, and so on.

The handwriting area provides a region where a user can draw or write a handwritten input. The touch-sensitive display can display one or more virtual keys, buttons, or the like, to provide additional functionality. In some implementations, the additional keys include a delete (or backspace) virtual key for deleting the last input character and re-displaying a previously cleared handwritten input thus giving the user the ability to modify their handwritten input even after it has been cleared from the handwriting area. Other keys include a space key for entering white space and/or accepting recognized text, a return key for entering a line break or the like, and a numbers and punctuation keyboard toggle key for toggling between the handwriting area and a virtual keyboard with number and punctuation keys. In some implementations, the UI includes a virtual button for switching amongst the handwriting recognition user interface and virtual keyboards for various languages.

The handwriting area allows a user to continuously input handwritten characters without having to stop in order to erase or clear the handwriting area (e.g., by applying a "clear-surface" operation) of previously input characters. In some embodiments, the handwriting area automatically clears, or removes a subset of the previous handwritten characters in order to enable the continuous handwriting input feature. In some embodiments, as a user inputs characters from left to right within the handwriting area (though the described features are equally applicable to right-to-left, top-to-bottom, bottom-to-top, etc. handwriting input), the device automatically clears the handwritten input that was previously received towards the beginning (e.g., left-most region) of the handwriting area. Thus, by the time that a user reaches the end (e.g., right-most region) of the handwriting area, the device has already cleared the beginning area of the handwriting area and the user is able to immediately shift back to the beginning of the handwriting area to continue providing handwriting input.

In some embodiments, rather than completely remove characters from the handwriting area, the device partially fades (e.g., by graying out) the handwritten input. That is, as the user inputs characters from left to right, the device partially fades out the handwritten input from the beginning (e.g., left-most region) of the handwriting area. As the user reaches the end (e.g., the right-most region) of the handwriting area, the user can then start back at the beginning, writing over the faded out handwriting. Once the user begins drawing a new character over a faded out character, the device completely removes this character from the handwriting area. In some embodiments, upon detecting active drawing of a new character over a faded out character, the device clears all of the handwriting input, including both faded out and fully displayed characters, from the handwriting area. In other embodiments, the device only clears the faded out characters over which the user has begun drawing new characters, or all of the faded out characters but not the fully displayed characters.

When a user draws a handwritten input in the handwriting area, the device compares the handwritten input to characters and words in a dictionary, corpus, repository, or the like. For example, the device can compare the handwritten input against English characters and words formed from English characters in an English character dictionary. Characters or words in the dictionary that include an initial character matching or resembling the handwritten input can be identified as candidates. The device can then automatically display the recognized candidate character (i.e., the "best" candidate) inline in the text area as the current input. In some embodiments, the current input is displayed with an underlining (e.g., "AB<u>C</u>" to indicate that the current input corresponds to the underlined character in the text area).

In some embodiments, the device displays a set of "$2^{nd}$-best" candidate keys that are a set of next-best matching candidates for a current handwritten input. This is particular useful when the automatically selected characters in the text area are not what the user intended. Criteria for determining next-best candidates can include word or character frequency and degree of match to the handwritten input, to name a few examples.

In some embodiments, the functionality of some virtual keys can be activated using gestures. Thus, for example, when the user is using the handwriting area to enter text, the user can perform a gesture on the handwriting area to add a space or delete a character, for example. In some embodiments, the gestures are pre-defined such that they are easily distinguishable by the device from character strokes. In some embodiments, the touch-sensitive display is a multi-touch sensitive display, and the gestures are multi-touch gestures.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
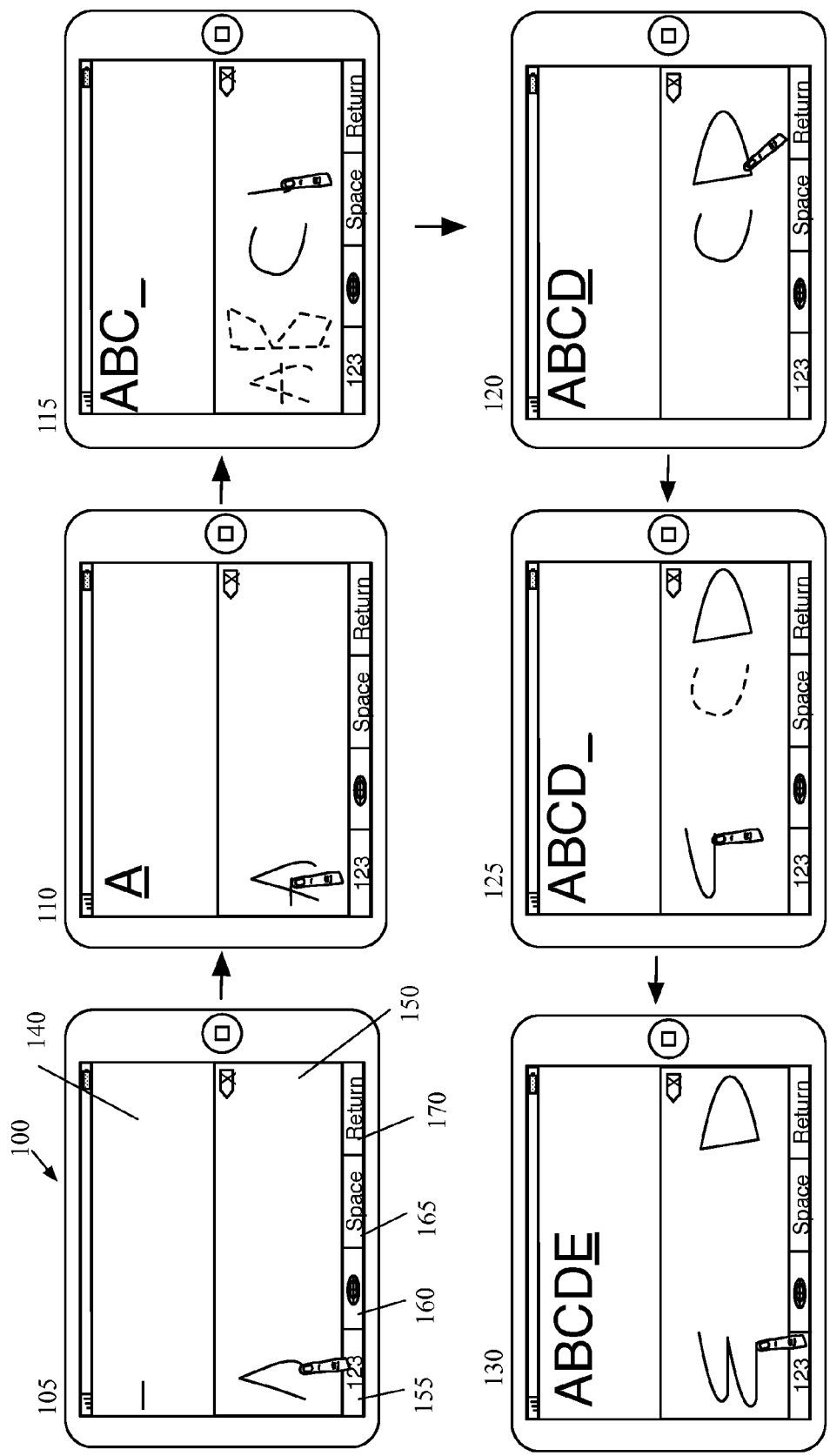
FIG. 1 illustrates an example user interface for entering characters using handwriting recognition on a mobile device.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a device (e.g., mobile device such as a smartphone or tablet, desktop, laptop, etc.) that receives handwriting input in a handwriting area and displays a recognized text for the input in a text area of the device. In some embodiments, the device displays the text area and the handwriting area on the touch sensitive display of the device. In some embodiments, the handwriting area and the text area may be the same area (for example, a user can handwrite in an area and the input is recognized as text within the same area). The text area can be any area where text input can be displayed, e.g., a note-taking application, an email application, and so on. For convenience, the implementations described in this specification are described primarily in reference to entry of English characters. It should be appreciated that the described implementations can be adapted for other languages (i.e., Chinese, etc.). Furthermore, certain features of the invention are particularly useful for certain languages (e.g., Chinese) while not as essential for others. For example, when compared to English characters, when a user inputs Chinese characters, the user generally has to spend more time thinking about the different aspects and details of the character, similar to a user spelling a word in English. Thus, the mechanism used to determine when and what handwriting input should be cleared from the handwriting area of some embodiments avoids placing any timer-based pressures on the user, which is especially useful for languages like Chinese that require a user to spend more time thinking about the details of the characters being input, while not as essential for a language like English where the characters generally require fewer details and less exact handwriting in order to differentiate between characters.

The handwriting area provides a region where a user can draw or write a handwritten input. The touch-sensitive display can display one or more virtual keys, buttons, or the like, to provide additional functionality. In some implementations, the additional keys include a delete (or backspace) virtual key for deleting the last input character and re-displaying a previously cleared handwritten input thus giving the user the ability to modify their handwritten input even after it has been cleared from the handwriting area. Other keys include a space key for entering white space, a return key for entering a line break or the like, and a numbers and punctuation keyboard toggle key for toggling between the handwriting area and a virtual keyboard with number and punctuation keys. In some implementations, the UI includes is a virtual button for switching amongst the handwriting recognition user interface and virtual keyboards for various languages.

The handwriting area allows a user to continuously input handwritten characters without having to stop in order to erase or clear the handwriting area (e.g., by applying a "clear-surface" operation) of previously input characters. In some embodiments, the handwriting area automatically clears, or removes a subset of the previous handwritten characters in order to enable the continuous handwriting input feature. In some embodiments, as a user inputs characters from left to right within the handwriting area, the device automatically clears the handwritten input that was previously received towards the beginning (e.g., left-most region) of the handwriting area. Thus by the time that a user reaches the end (e.g., right-most region) of the handwriting area, the device has already cleared the beginning area of the handwriting area and the user is able to immediately shift back to the beginning of the handwriting area to continue providing handwriting input.

In some embodiments, rather than completely remove characters from the handwriting area, the device partially fades (e.g., by graying out) the handwritten input. That is, as the user inputs characters from left to right, the device partially fades out the handwritten input from the beginning (e.g., left-most region) of the handwriting area. As the user reaches the end (e.g., the right-most region) of the handwriting area, the user can then start back at the beginning, writing over the faded out handwriting. Once the user begins drawing a new character over a faded out character, the device completely removes this character from the handwriting area. In some embodiments, upon detecting active drawing of a new character over a faded out character, the device clears all of the handwriting input, including both faded out and fully displayed characters, from the handwriting area. In other embodiments, the device only clears the faded out characters over which the user has begun drawing new characters, or all of the faded out characters but not the fully displayed characters.

When a user draws a handwritten input in the handwriting area, the device compares the handwritten input to characters and words in a dictionary, corpus, repository, or the like. For example, the device can compare the handwritten input against English characters and words formed from English characters in an English character dictionary. Characters or words in the dictionary that include an initial character matching or resembling the handwritten input can be identified as candidates. The device can then automatically display the recognized candidate character (i.e., the "best" candidate) inline in the text area as the current input. In some embodiments, the current input is displayed with an underlining (e.g., "AB<u>C</u>" to indicate that the current input corresponds to the underlined character in the text area).

In some embodiments, the device displays a set of "2<sup>nd</sup>-best" candidate keys that are a set of next-best matching candidates for a current handwritten input. This is particular useful when the automatically selected characters in the text area are not what the user intended. Criteria for determining next-best candidates can include word or character frequency and degree of match to the handwritten input, to name a few examples.

In some embodiments, the functionality of some virtual keys can be activated using gestures. Thus, for example, when the user is using the handwriting area to enter text, the user can perform a gesture on the handwriting area to add a space or delete a character, for example. In some embodiments, the gestures are pre-defined such that they are easily distinguishable by the device from character strokes. In some embodiments, the touch-sensitive display is a multi-touch sensitive display, and the gestures are multi-touch gestures.

FIG. 1 illustrates an example user interface for entering characters using handwriting recognition on a mobile device such as a smart phone (e.g., Apple™ iPhone™) or tablet (e.g., Apple™ iPad™). In particular, FIG. 1 illustrates the automatic recognition and subsequent removal of characters from the handwriting area 150 as a user inputs characters from left to right (beginning to end) across the handwriting area 150. Users may input handwriting for different languages in different directions (e.g., right to left), and the device would clear the handwriting area accordingly (i.e., clearing the characters starting at the right side of the handwriting area for right-to-left languages). As illustrated in stage 105, the user has provided handwritten input in the handwriting area 150 in the shape of a ""A".". At this particular stage, the text area 140 is not displaying any characters because it has not yet recognized a character, or recognized a character at a sufficient threshold level of certainty as required by the device 100. As described below in FIGS. 5-6, some embodiments may require that a handwritten input be recognized at certain threshold levels of certainty before the text characters are displayed within the text area. For example, some embodiments may instantaneously display the best-matching text characters for any handwritten input (i.e., no level of certainty) while other embodiments may only display a text character after a certain threshold level of certainty (e.g., low, medium, high, etc.) has been met that the particular handwritten input corresponds to a particular character.

Stage 110 illustrates the user is providing input to cross the "A", which causes the device 100 to now display the character "A" in the text area 140. In this example, even though the user has not completely finished inputting the letter "A", the device 100 has recognized with a sufficient level of certainty (e.g., medium level of certainty) that the user is drawing the letter "A". After inputting several characters in the handwriting area 150, the user is approaching the end of the handwriting input area and thus will soon run out of space to input characters. In order to allow the user to continue inputting characters, the device 100 may begin to remove (e.g., clear, fade, etc.) the characters in the left-most portion of the handwriting area 150 (when writing in a language that is from left-to-right) in order to clear this area such that the user may continue to provide handwriting input without interruption. Stages 115-130 of FIG. 1 illustrate a fading mechanism of the device that allows the user to continue to provide handwritten input without having to stop to perform any sort of clearing operation to clear the area.

Stage 115 illustrates the user has input the characters "ABC" and is in the process of inputting another character. The text area 140 displays the characters that have been recognized for the handwritten input "ABC". Furthermore, in this stage, the device 100 is now beginning to fade the characters "AB" from the handwriting area 150. In particular, at this stage the device 100 has determined that the user has likely finished the characters "A" and "B" and thus the handwriting input corresponding to these characters may be removed from the handwriting area 150 in order to clear this portion such that it is available to receive a user's subsequent input. Stage 120 illustrates that the user has now completed the letter "D" and the letters "A" and "B" have been removed from the handwriting area 150. The text area 140 displays all of the letters (i.e., "ABCD"). As such, the user can continue to input characters in the now cleared handwriting space without interruption. Stage 125 illustrates the user inputting a new character at the left most location of the handwriting area 150 and the fading of the next character "C" from the handwriting area 150. Stage 130 illustrates that the user has finished drawing the character "E", and that the letter "C" is now completely faded from the handwriting area 150.

FIG. 1 illustrates that as the user traverses across the handwriting area 150, the device 100 automatically clears portions of the handwriting area 150 in order to allow a user to continue inputting characters. In some embodiments, the particular mechanism used to determine when and what portion of a particular handwritten input is removed from the handwriting area may be based on various factors. These factors include the number of subsequent characters received after a particular handwritten input that is to be removed, the time the particular handwritten input has been displayed in the handwriting area, or the location of the user's subsequent input within the handwriting area in relation to the particular handwritten input. Furthermore, by removing handwritten input based on character and location-based factors, the device avoids placing any timer-based pressures on the user. As such, the user may proceed to provide input at a pace at which they are comfortable (i.e., without any timer-based pressures imposed by the device).

Figure 2:
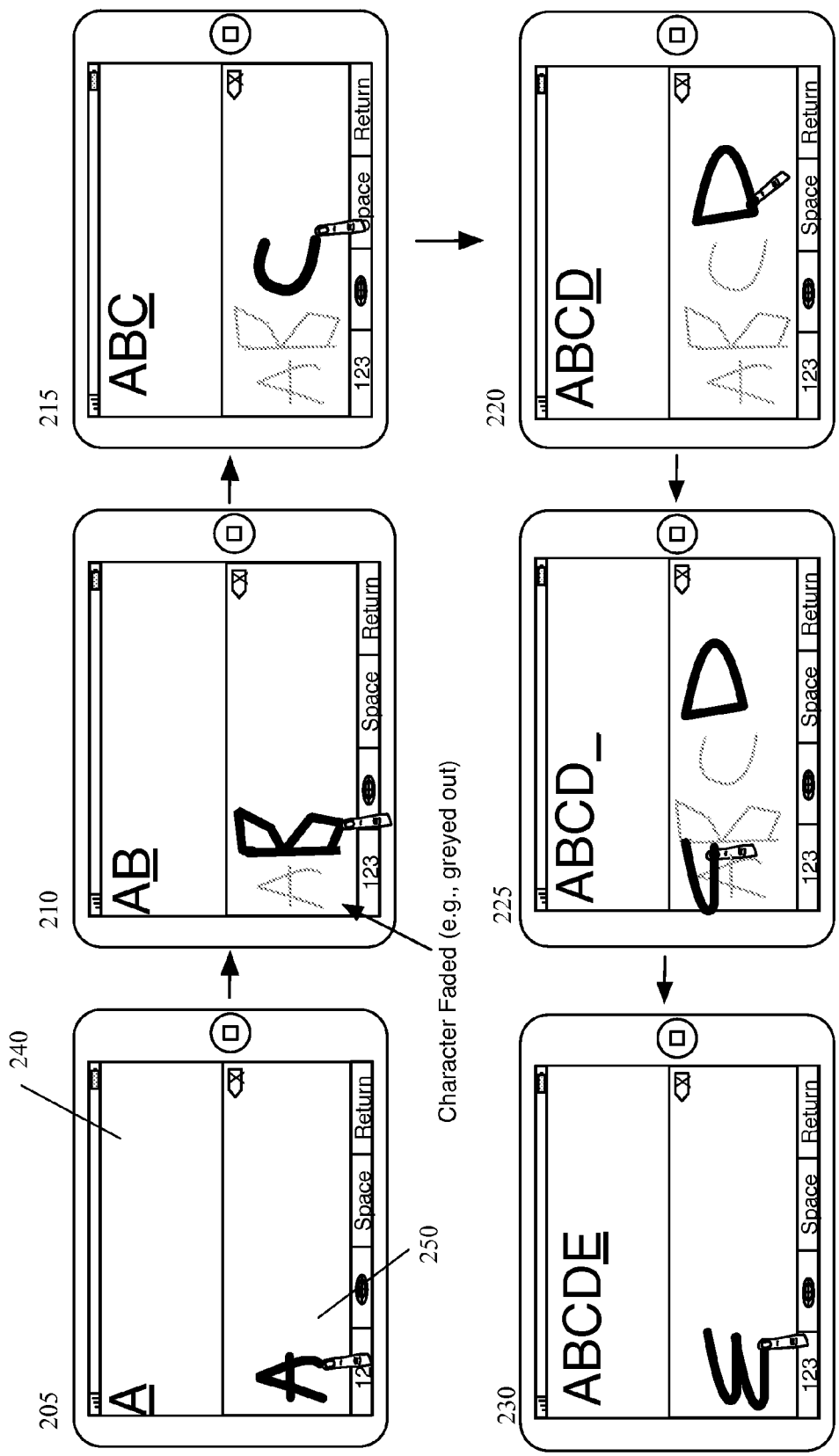
FIG. 2 illustrates an example of the device fading a character and the subsequent clearing of the handwriting area upon receipt of a user's input over the faded character.

As described above, in some embodiments, the device partially fades out characters in the handwriting area (e.g., by changing the color of the displayed handwriting from black to gray) as the device continues to receive additional handwriting input (e.g., after receiving a certain number of subsequent characters). The user may then provide handwriting input over the faded out characters, at which point the device completely removes the faded characters from the handwriting area. FIG. 2 illustrates in six stages 205-230 an example of the device fading out and removing characters in the handwriting area in order to allow a user to continuously provide handwriting input. Stage 205 illustrates the user drawing the character "A" in the handwriting area 2050, and the display of the corresponding text character in the text area 240. Stage 210 illustrates the user has now input a letter "B" and the device is displaying the "A as faded (i.e., grayed out) within the handwriting area 250. Once the character is displayed as a "faded" character, the user may not modify this character unless, as described below in FIGS. 17-20, the user re-activates the character (using, e.g., a "delete" or "modify" selectable item), which would cause the device to remove the fading of the character, and display it as a fully editable character (e.g., by displaying the character as black rather than gray).

In some embodiments, the device may fade the character by using a different color (e.g., gray) to illustrate that the character has been faded. In order to illustrate the fading effect in this example, the faded characters are illustrated in gray with a narrower thickness (i.e., thickness setting of 1) than the non-faded, editable characters. Thus, the un-faded characters are shown in black with a larger thickness than the faded characters. In some embodiments, the device does not actually display the strokes of the grayed-out characters as thinner than the editable black characters, but instead just changes the color (e.g., to a light gray).

Stage 215 illustrates the user inputting another character "C" into the handwriting area 2050, which causes the device to fade out the character "B". As described below, some embodiments apply a variety of factors in determining when to fade out a character. For example, some embodiments apply a buffer such that a particular number of characters remain between the current (most recently drawn) character and the most recently faded out character. In this example, the device fades out a first character upon recognition of the second character (i.e., with no buffer of editable characters between the two). Other embodiments may use a buffer of additional (i.e., one or more) characters between the current and the most recently faded out characters. Furthermore, yet other embodiments may use different factors, such as passing location thresholds, timers, etc.

Stage 220 illustrates the user drawing a "D" which causes the device to fade out the display of the "C" in the handwriting area 250. Furthermore, at this stage, the user has a minimal amount of clear space to continue inputting characters, and accordingly, will need to return back to the beginning (left side) of the handwriting area 250 in order to input subsequent characters. Thus, stages 225 and 230 illustrate the user continuing to draw handwritten characters over the faded characters in order to continue writing without interruption. In particular, stage 225 illustrates the user starting to draw a character over the faded characters "AB". In some embodiments, when the user begins inputting a new character over a previously faded character, the device automatically clears the handwriting area 250, as illustrated by stage 230. In particular stage 230 illustrates that the user has now finished inputting a letter "E" and the entire handwriting area 250 has been cleared of the previous handwritten characters (i.e., "ABCD"). In some embodiments, the device only clears the particular faded character (or set of faded characters) over which the handwriting input is actually received. Thus in this example, the device would only clear the faded characters "AB" since these are the faded characters over which the new letter "E" is being input. In yet other embodiments, the device clears all of the faded characters (and retains the editable, non-faded characters) upon receipt of a user input over any of the faded characters. Thus in this example, the device would clear the "ABC" and continue to display the "D", although the "D" would be faded out when the user draws the new character "E" over any one of the faded out characters "ABC".

Figure 3:
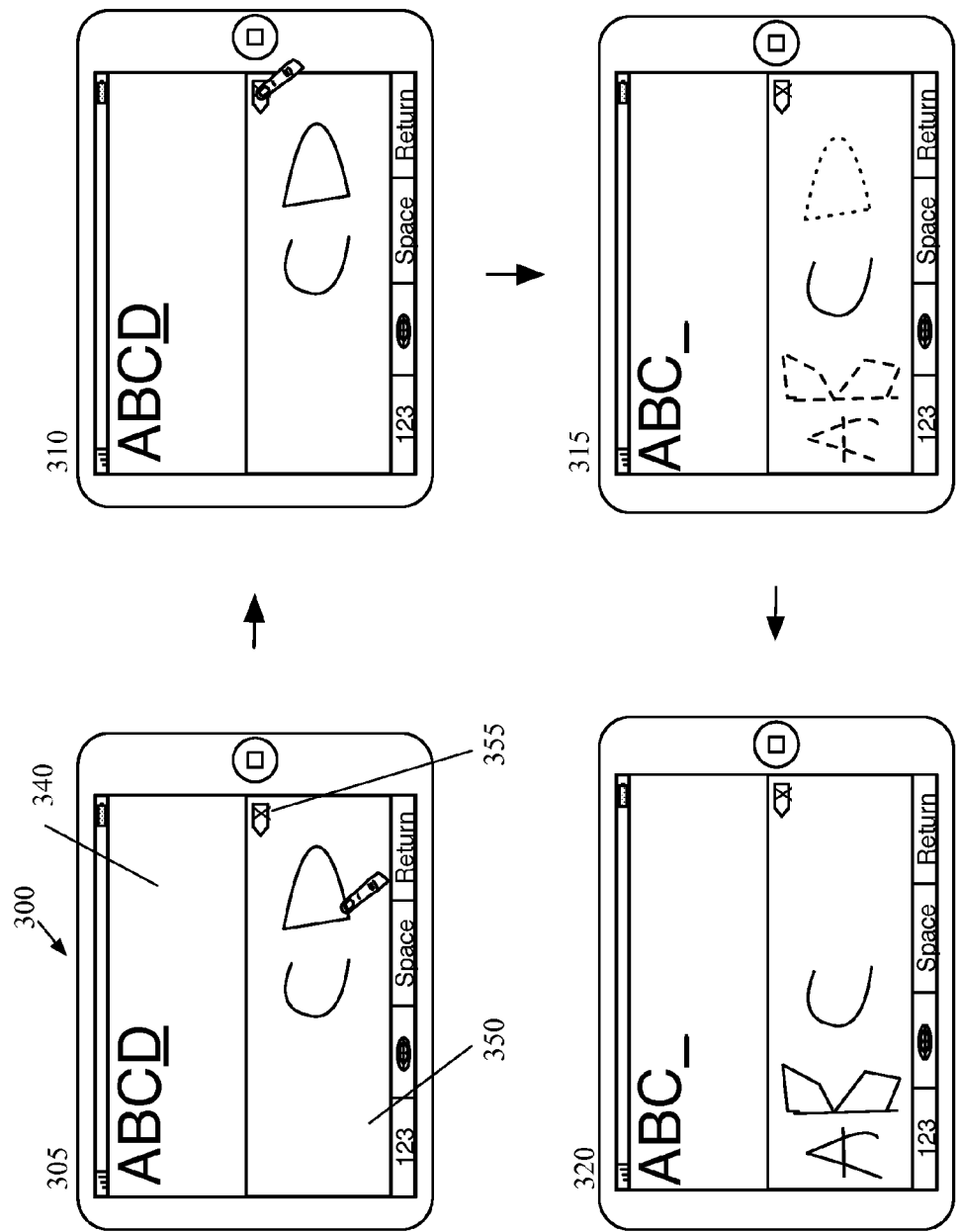
FIG. 3 illustrates a "delete" virtual key for modifying handwritten input in a handwriting area.

Furthermore, even after a handwritten input has been removed or faded from the handwriting area, the user can select a "delete" (or backspace) virtual key (or other equivalent menu item or short-cut key) in order to re-display the previously removed or faded handwritten input characters. For example, the user can modify this handwritten input even after it has been removed from the handwriting area. FIG. 3 illustrates in four stages 305-320 the user selecting a "delete" virtual key 355 in order to modify handwritten input that was previously removed (e.g., faded out) from the handwriting area 350.

Stage 305 illustrates the device 300 displaying the handwriting area 350 and the corresponding recognized text area 340. As illustrated, the user has provided input in the handwriting area 350 for the letter "C" and is in the process of completing the letter "D". The text area 340 indicates that thus far, the characters "ABCD" have been input by the user. The underline on the "D" indicates that this is the current character that is being recognized by the device 300 for the user's handwritten input.

Stage 310 illustrates the user selecting the delete virtual key 355. In some embodiments, the user may provide a certain gestural input to activate this key (e.g., a swiping gesture in a particular direction). Selection of the delete key causes the device to re-display the handwritten input corresponding to certain characters that were removed from the handwriting area. As illustrated in stage 315, the device 300 is now fading back in the handwritten input for the characters "AB" and likewise removing the handwritten input for the character "D" from the handwriting area 350. As such, the device 300 has deleted the character "D" from the text area.

Stage 320 illustrates the handwritten letters "AB" are now completely faded back into the handwriting area 350. As such, the user may re-modify these characters or add additional characters in the space that was previously occupied by the letter "D". Thus, the delete virtual key provides a mechanism for re-displaying handwritten input after it has been removed from the handwriting area. In some embodiments, after the user multi-selects (i.e., double-taps) the delete key in quick succession, the device will completely clear the handwriting area (and the corresponding text in the text area).

Furthermore, after each successive selection of the delete key, the device will remove a text character from the text area.

As described above, the device will only fade a handwritten input of a character from the handwriting area after some threshold value (i.e., "n" number of subsequent characters, a particular threshold location has been crossed, etc.) has been satisfied. While the above examples show the "A" and the "B" characters fading out and being restored together, in some embodiments the device fades out one character at a time as the user moves on to the next character. For example, in some embodiments, the device would have already faded out the letter "A" in stage 115, and would then fade out the letter "B" as the user begins drawing the letter "D". Similarly, when the user hits the delete virtual key 355 in stage 310, this would cause the device 300 to only restore the letter "B".

Using these character or location-based thresholds allows the device to avoid putting timing constraints on the user. For example, on devices that use only a timer-based clearing mechanism such as automatically clearing an input area after 3 seconds have elapsed, the user is pressured to input characters at a pace at which they might not be comfortable. Furthermore, a user is unable to go back and modify a character after the particular time period (i.e., 3 seconds) has elapsed. By avoiding using simply a timer-based removal mechanism, but rather applying character and/or location-based factors, a user is able to spend as much time as the user pleases when inputting characters. This is particularly useful for certain languages (i.e., Chinese) that generally require a significant level of detail for each character.

Figure 4:
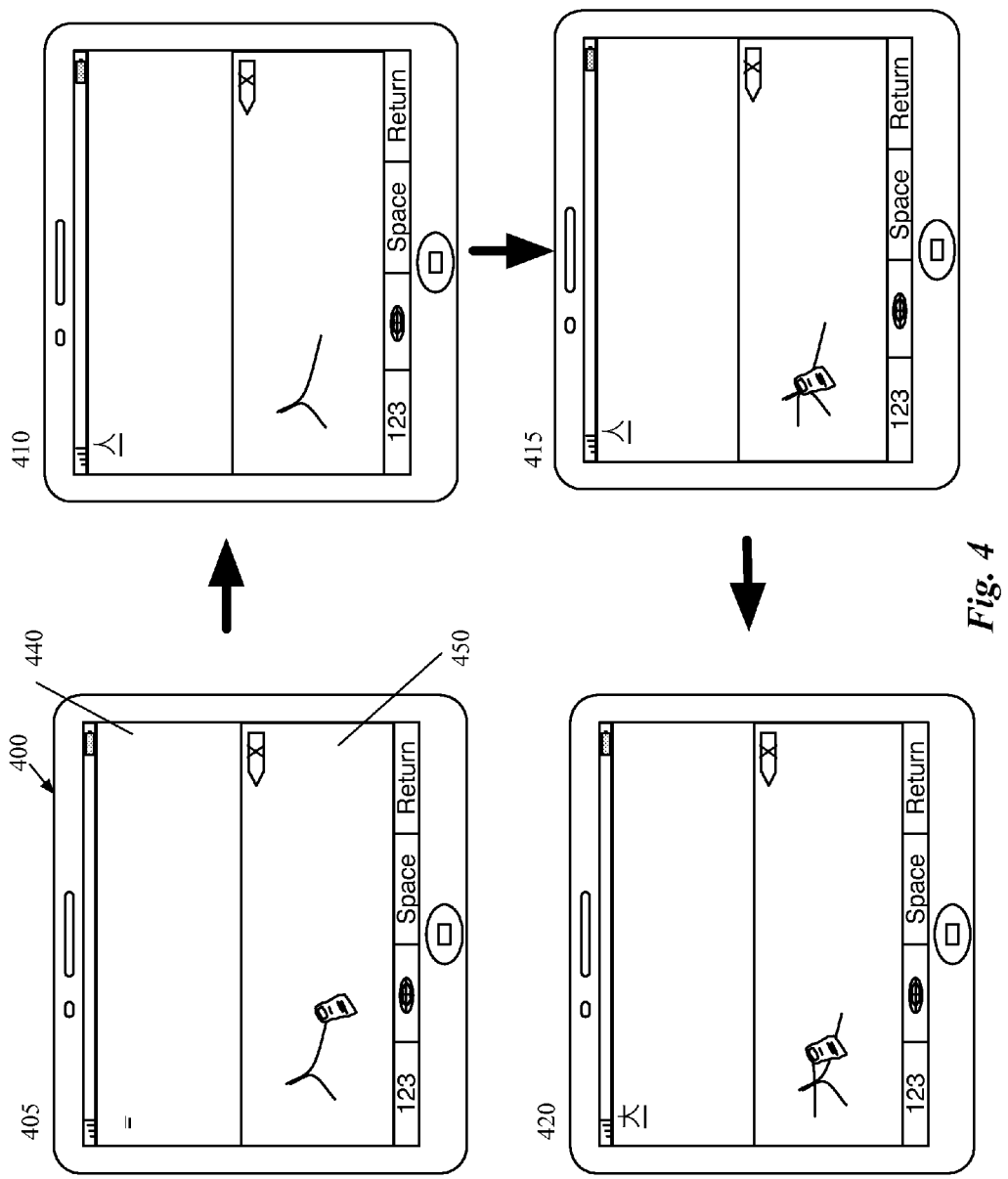
FIG. 4 illustrates a user modifying Chinese characters within an handwriting area.

FIG. 4 illustrates a user modifying Chinese characters (with no timer-based pressures to input the character within a certain time period). In particular, the user is inputting a Chinese character that is initially recognized as the character "人" and then modified to become the character "大". Stage 405 illustrates the user is providing a handwritten input corresponding to the Chinese character "人". Stage 410 illustrates the text area 450 has now recognized this particular character. Furthermore, the user has discontinued providing any input at this point. For example, the user may be thinking about the particular details of the Chinese character. Stage 415 illustrates the user again providing input in the handwriting area 450, after pausing for a period of time (e.g., several seconds, one or more minutes, etc.). In particular, the user has provided additional handwritten input such that the drawn character now corresponds to the Chinese character "大". Stage 420 illustrates the user has completed drawing a crossing mark across the top portion of the character. As such, the user can modify a character without having any sort of timer-based constraints by which they must input the characters. As illustrated in this figure, avoiding a solely timer-based removal mechanism is particularly useful for languages like Chinese whose characters generally require a longer period of time and higher attention to detail than other languages (i.e., English).

The above-described features as well as some other features of the continuous handwriting of some embodiments are further described below. In the description above and below, many of the features are described as part of an operating system that provides a novel handwriting input area. However, one of ordinary skill will realize that the novel aspects of the handwriting input area may be present in other embodiments or operating systems that do not perform all of these operations, or perform other operations in addition to these operations.

Several more detailed embodiments of the invention are described below. First, the specification provides a description of the automatic character recognition of a handwritten input of some embodiments, and then describes different mechanisms for automatically clearing the handwriting area of some embodiments. The specification describes several of the virtual candidate keys of some embodiments for providing a set of "$2^{nd}$-best" candidates that have been matched to a handwriting input, and then a delete virtual key for re-displaying a previously removed handwritten input for subsequent edits. The specification next describes a software architecture of some embodiments of the system. Finally, the specification provides a description of several electronic systems that implement some embodiments of the invention.

Figure 5:
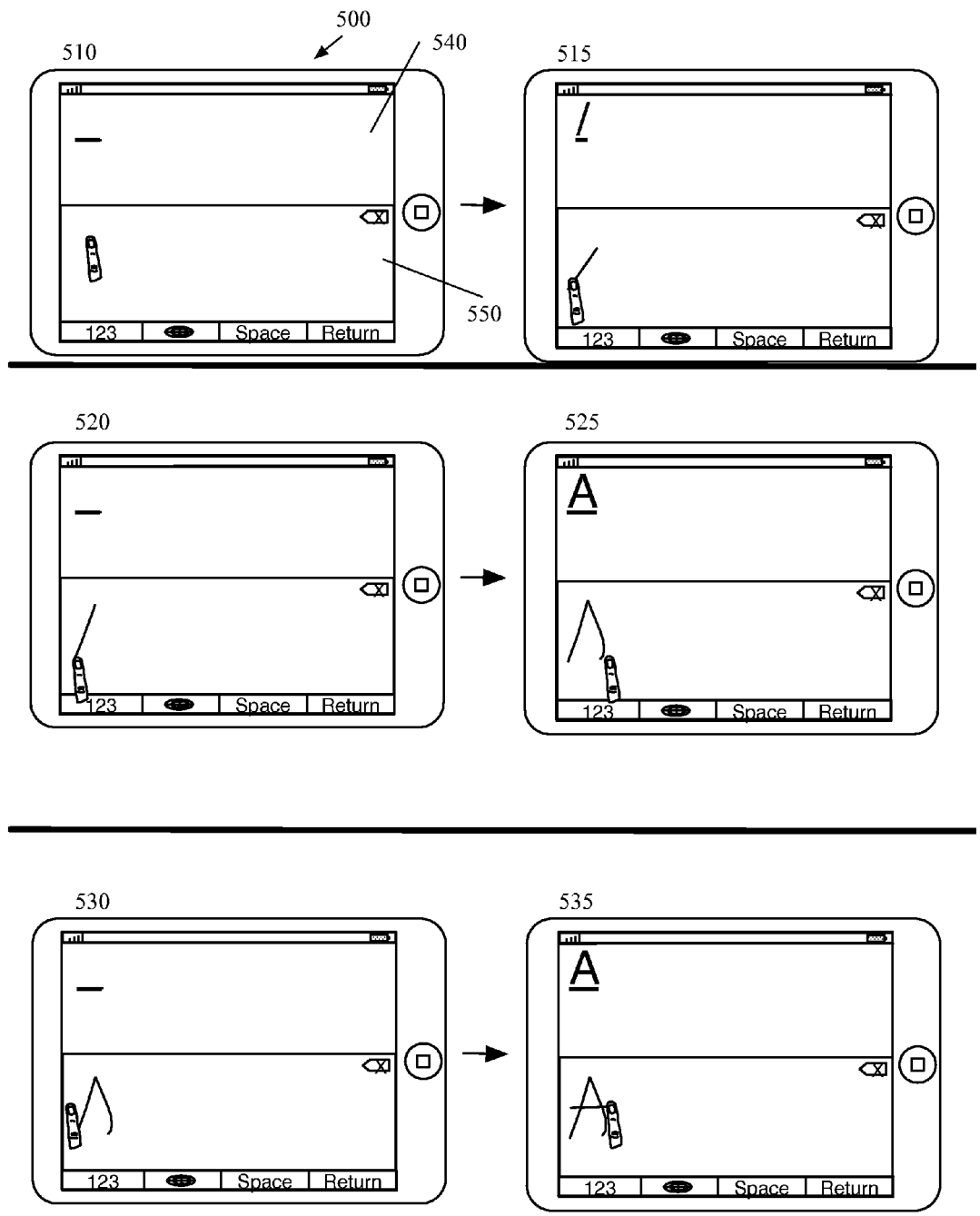
FIG. 5 illustrates examples of the device applying a different threshold for displaying a recognized character for a given handwritten input.

As described above, after the device recognizes a user's handwritten input, the device automatically displays the corresponding text input within the text area without requiring the user to provide any additional input (i.e., confirmation that the character is correct etc.). This allows the user to continuously provide handwritten input without having to perform other time consuming operations (i.e., confirming that the characters are correct etc.) Different embodiments provide different thresholds for when a character is displayed within the text area. For example, some embodiments instantaneously display a best-matching character for a user's current handwritten input while other embodiments wait until a certain threshold level of certainty has been met regarding the identity of the character prior to displaying the character. FIG. 5 illustrates three different examples of the device applying a different threshold for displaying a recognized character for a given handwritten input. The first example in stages 510-515 illustrates instantaneous recognition (i.e., "lowest-level" of certainty), the second example in stages 520-525 illustrates recognition when a higher (i.e., "mid-level) level of certainty has been met (i.e., the character is recognizable but not completed), and the third example in stages 530-535 illustrates recognition after an even higher (i.e., high-level) level of certainty has been met (i.e., character is completed).

Stage 510 of the first example illustrates a user beginning to provide a touch input in the handwriting area 550. At this particularly stage, the device has not received any input and thus the text area 540 is completely clear. Stage 515 illustrates that as soon as the user begins to provide the input (in the shape of a dash) the device 500 displays the best-matching candidate for the input, which in this case is the character "/". This illustrates that the device 500 instantaneously matches the user's handwritten input to the best-matching character candidate and displays the recognized character in the text area 540. Thus, there is no particular level of certainty regarding the identity of the character (i.e., lowest-level of certainty).

The second scenario in stages 520-525 illustrates the text area 540 only displaying a character after a higher, "mid-level" of certainty with respect to the intended handwritten character has been met. Stage 520 illustrates the user has input a slash ("/") in the handwriting area 550, but at this stage, the device 500 has not yet displayed a recognized text character in the text area 540. While this input corresponds quite well with a slash ("/"), the likelihood of this corresponding to the user's desired input is not actually high enough for the device 500 to display the slash in the text area 540. The device has recognized that, unless the user stops drawing the character (at which point the likelihood that the character is a slash might increase above the threshold), the user is likely to add additional strokes to the character (e.g., to draw an "A", an "N", an "M", etc.). Stage 525 illustrates the user has now input another stroke to make a ("""∧". ") which the device 500 has recognized with a mid-level of certainty that the user intends to input the character "A". Thus the device 500 now displays the text character "A" within the text area 540.

The third example in stages 530-535 illustrates the device 500 requiring an even higher, "high-level" of certainty regarding the handwritten input character prior to displaying the character in the text area 540. In particular, only after the device 500 determines that the user has completed (or is close to completing) the character, will it display the corresponding text character in the text area 540. In particular stage 530 illustrates that the user has input the ""/\".", but the device 500 is not yet displaying any character in the text area 540 (unlike stage 525 of scenario 2). At this juncture, the user might still intend to draw an "N", an "M", etc., such that the probabilities for each possible character are low enough that the device 500 has not identified any of them with a threshold high-level of certainty. Stage 535 illustrates the user has completed the handwritten letter "A", at which point the device 500 is able to determine with a high level of certainty that the intended letter is "A". Thus at this stage, the device is now displaying the letter "A" in the text area 540. In some embodiments, the device also applies several other factors to determine the certainty level of a character, including whether the user has begun inputting a subsequent character, the time that has elapsed since the user input the particular character, the context of the character within, for example, a word being spelled by the character. For example, if the user inputs a "/" and then proceeds to write a character "B", the device increases the certainty level that the user intended the character "/" as opposed to an "A".

Figure 6:
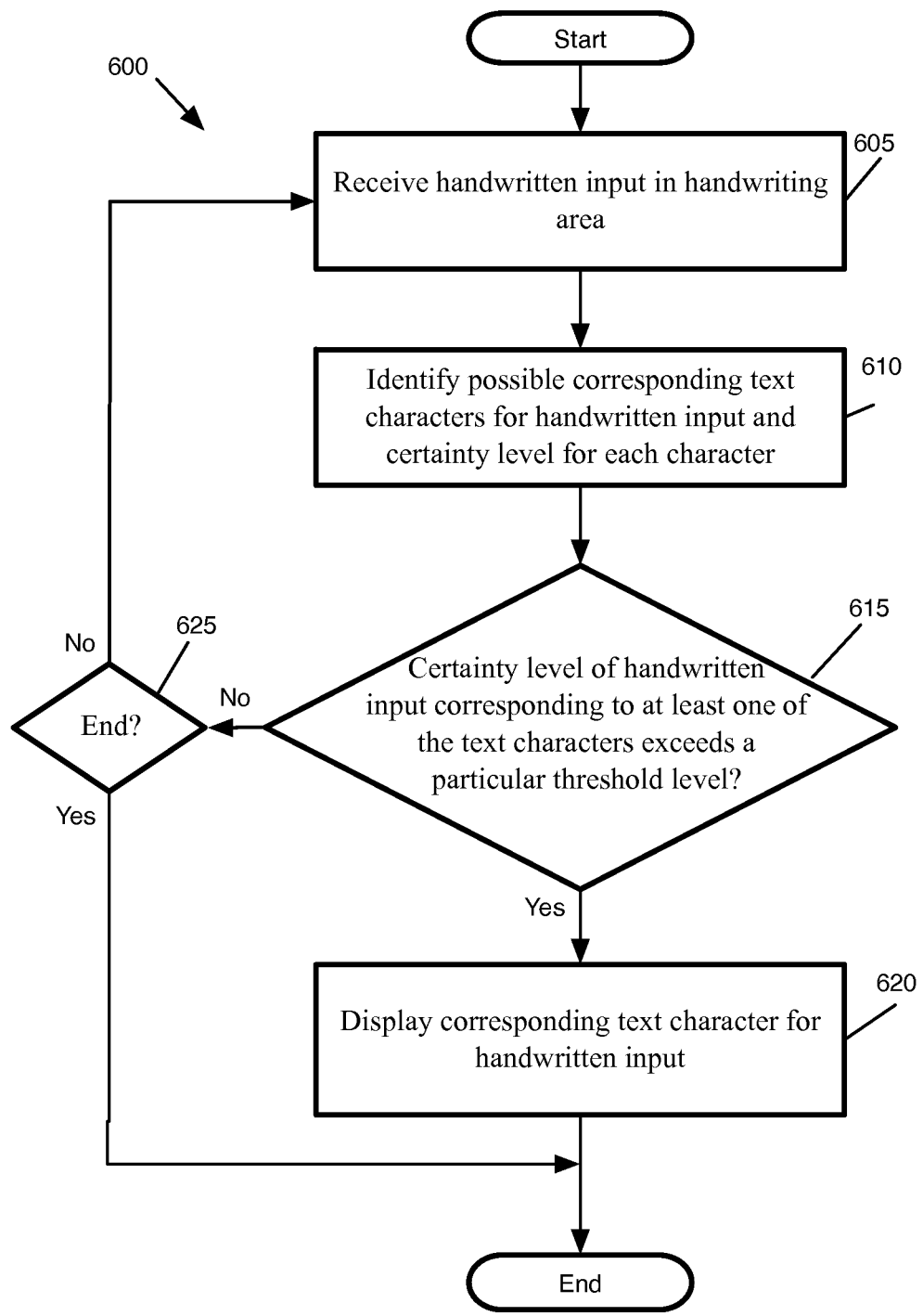
FIG. 6 illustrates a process for determining when to display a text character for a corresponding handwritten input.

FIG. 6 illustrates a process for determining when to display a text character for a corresponding handwritten input. In some embodiments, the process is performed by the device on which the handwriting is received (e.g., by an operating system of the device, an application or other software of the device, firmware of the device, etc.). As shown, the process begins by receiving (at 605) a handwritten input in a handwriting area of a device. The input may be a touch input on a touch sensitive display of the device or input from a stylus, etc. In some embodiments, the input is received in a specific region of the touch sensitive screen, identified as a handwriting input area in the graphical user interface displayed on the screen.

Upon receiving this input, the process identifies (at 610) possible corresponding text characters for the handwritten input, and a certainty level for each identified character. As described above by reference to FIG. 5, the certainty level may be different based on how close of a match there is between the handwritten input to the corresponding text character. In some embodiments, the certainty levels are calculated as probabilities that the user intends the handwriting input to correspond to a particular character. Thus, in some embodiments, all of the identified certainty levels for the possible characters add up to 100%. For example, in the first example of FIG. 5 (stages 510 and 515), the device 500 might identify a slash ("/") with a 20% certainty level, an "A" with a 15% certainty level, each of an "M" and "N" with 10% certainty levels, and various other characters each at a 5% certainty level. In order to calculate these probabilities, some embodiments take into account the direction of the stroke (or strokes), the context within other characters (e.g., whether the letter fits into a known word when combined with previous characters), whether the user has started drawing a next character, etc.

The process then determines (at 615) whether the certainty level of the handwritten input corresponding to at least one of the identified possible text characters exceeds a particular threshold level of certainty required by the device. Different embodiments may specify different threshold levels. For example, a low, mid, and high threshold level could correspond to different likelihoods that a handwritten input corresponds to a particular text character (e.g., 5%, 50%, 75%). This may be a user setting (e.g., for the operating system, for the application, etc.), or may be a non-modifiable setting of the device.

If the threshold level is satisfied, the process displays (at 620) the corresponding text character(s) for the handwritten input (e.g., in a different area of the graphical user interface than where the user provides the handwriting input). In some embodiments, when multiple characters have certainty levels exceeding the threshold, the device displays the character with the highest certainty level. This situation is most likely to occur with a low threshold (e.g., 5%, 10%). In this case, many characters may exceed the threshold certainty level, and the device displays the most likely character.

Otherwise, the process determines (at 625) whether to end. The process may end prematurely if, e.g., the user ends the application for which the handwriting input is used, the device is shut off, etc. In addition, the process might end when the user provides input indicating the completion of the current word, character, etc. If the application executing on the device continues to do so, the process returns to 605 to wait for subsequent handwritten input. Otherwise, the process ends. In some embodiments, when the process ends due to the user indicating completion of the present input (e.g., pressing a space bar or enter touchscreen key, pressing send on a text message, etc.), the process selects the text character with the current highest level of certainty for the handwritten input.

In order to enable a user to continuously provide a handwritten input, the device of some embodiments automatically clears portions of the handwriting area as the user traverses across the handwriting area while inputting characters. Different embodiments may apply different factors in determining when and what to remove from the handwriting area. For example, after a user has input several characters (and is reaching the end of the screen space), the device may automatically remove the handwritten input corresponding to characters at the beginning of the handwriting area. In some embodiments, the device may animate the removal of the handwritten input characters (e.g., apply a fade out animation to the characters). Other embodiments may scroll the handwritten input off of the left-hand side of the display screen (for a left-to-right oriented language). In some embodiments, the user may apply a scrolling gesture in order to scroll the handwritten input off of the screen and thus obtain a clear handwriting input area.

Figure 7:
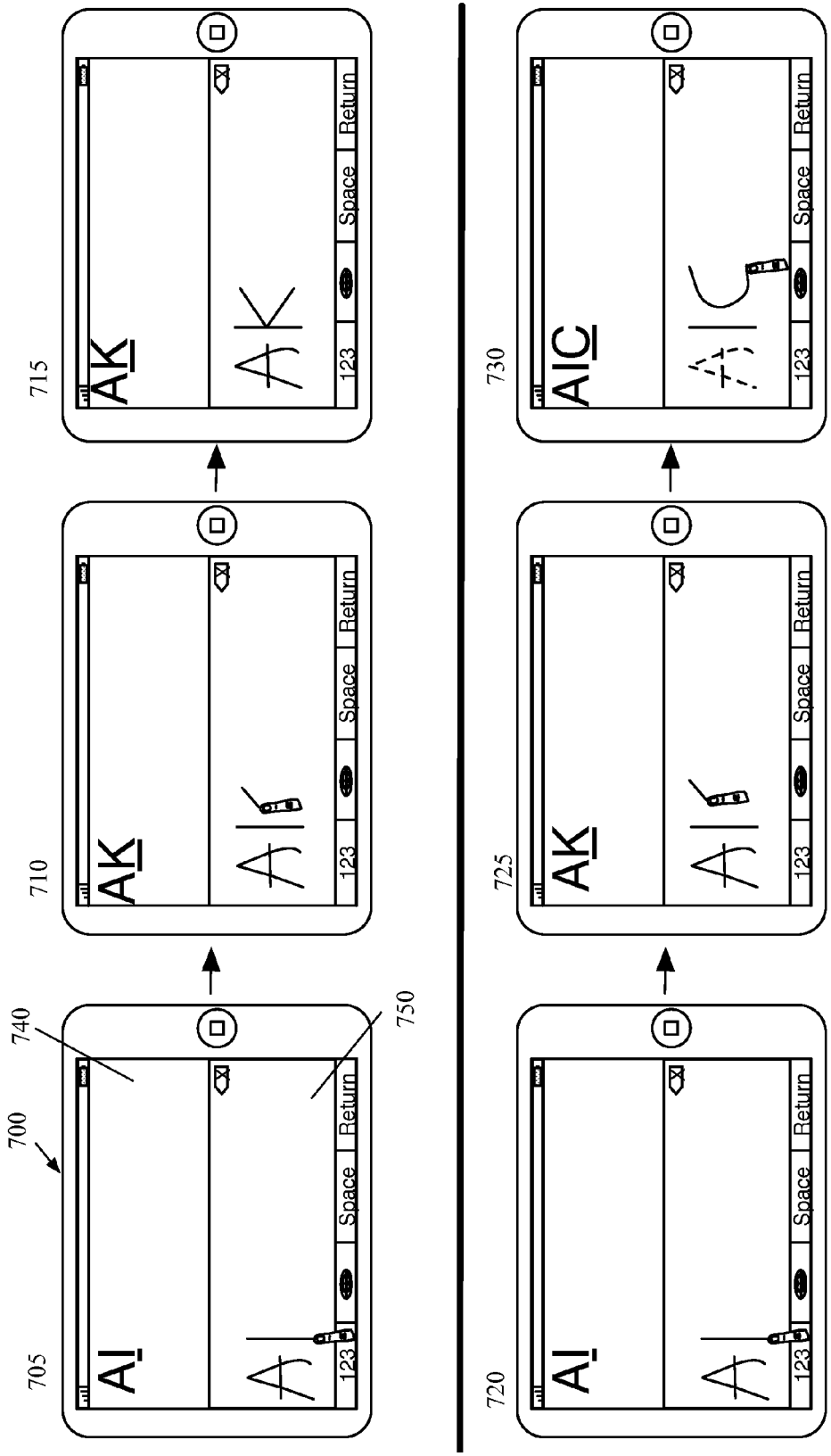
FIG. 7 illustrates the determination of a "subsequent" character in an embodiment that applies a 1-character buffer between the removed character and the currently input character.

In some embodiments, the device removes a character only after the device determines that a handwriting input is for a "subsequent" character (and not for the particular character being removed). In some embodiments, the device may set a certain number of characters (i.e., "n" characters) as a buffer between the character being removed from the handwriting area and the subsequent character being input by the user. FIG. 7 illustrates the determination of a "subsequent" character in an embodiment that applies a 1-character buffer between the removed character and the currently input character. In particular, FIG. 7 illustrates two examples of the device determining whether an input is related to a subsequent character or a current character. In particular, the first example (three stages 705-715) illustrates a user providing a handwritten input and the device 700 determining that the input is not related to a subsequent character, whereas the second example (three stages 720-730) illustrates the device 700 determining that an input is related to a subsequent character.

Stage 705 illustrates the device 700 receiving a handwritten input for the character "1", after having previously received input for the character "A". At this point, the device 700 has recognized these characters and displayed them in the text area 740. In this particular example, the user could provide input to the right of the stroke recognized as the character "1" in order to modify this handwriting into a different character, or to provide input for a third, or "subsequent" character. Thus, with a 1-character buffer, the device 700 will only remove the character "A" if subsequent input appears to be for drawing a subsequent character to the right of the "1" (i.e., does not appear to be for modifying the character currently recognized as an "1").

The second stage 710 illustrates the user has input a stroke running down and left towards the previous stroke, and thus the device 700 now identifies the second character as a "K" rather than a "1" (and therefore displays a "K" in the text area 740. As the device 700 identifies this input as part of the previously-started character and not a new character (e.g., based on the location and direction of the input), the device 700 does not yet begin removing (e.g., by fading out) the "A". As illustrated in stage 715, the user in this example actually intends to input the characters "A" and "K", and with the 1-character buffer between fading of characters, the device 700 has not yet begun removing the "A".

Example two (stages 720-725) is similar to the first example, except that in this case the user provides handwritten input that is for a third character and thus the device 700 removes the handwritten input for the first character "A". As in the first example, stage 720 illustrates the device 700 displaying the characters "A" and "1", and stage 725 illustrates the user inputting a stroke that causes the device 700 to recognize the character "K" as the most likely second character. However, stage 730 illustrates that the stroke begun in the stage 725 is actually input for the character "C" (as opposed to "K in the 1$^{st}$ scenario). Thus, at this particular point in time, the device 700 identifies that the handwritten input is for a third character, separate from the second character "1 ". Thus, when the device 700 determines that the handwritten input relates to a new ("subsequent") character, the device 700 removes (e.g., begins to fade) the "A" from the handwriting area 750. By automatically removing portions of the handwritten input, the device allows the user to continue to provide handwritten characters without having to, for example, apply a clear-surface operation (using a clear key etc.). In this example, the device 700 applies a 1-character buffer between the particular character being removed and the subsequent character. However, as described below, different embodiments may use a different number of characters (i.e., 1, 2, 3, N etc.) as a buffer before removing characters from the handwriting area 750 for the character buffer or a fractional character buffer.

Some embodiments may also factor in the size of the handwritten characters in relation to the size of the handwriting area and modify this threshold accordingly. For example, if a particular user writes very large handwritten characters that occupy a significant portion of the handwriting area, the device may immediately fade the character upon its recognition without receiving a subsequent input. However, when the handwriting area of the device permits several characters, the device may utilize some threshold number of characters within the particular fading mechanism.

Figure 8:
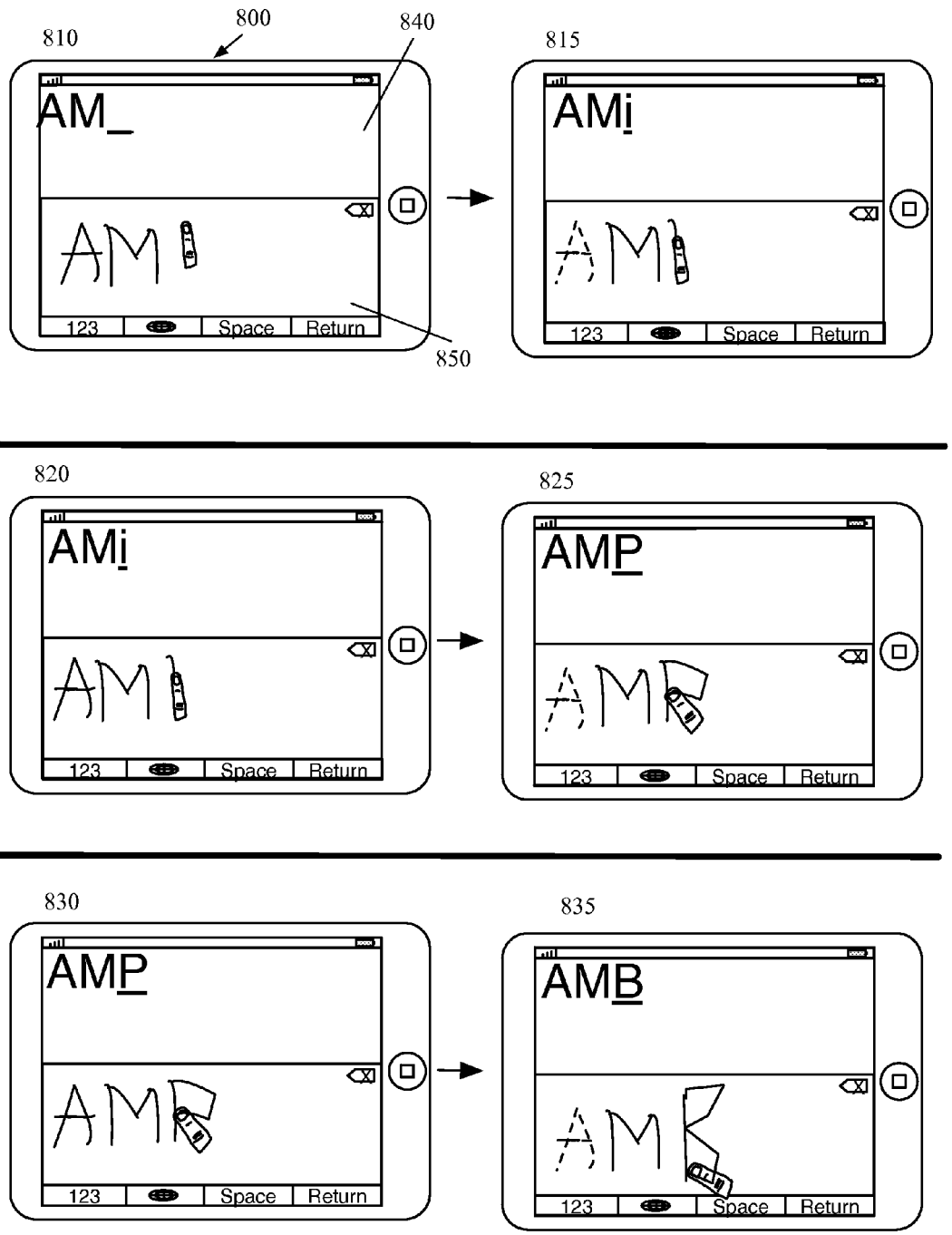
FIG. 8 illustrates examples of different levels of recognition at which the device may determine to remove a particular character.

Furthermore, different embodiments may remove the handwritten input at different levels of recognition of the subsequent character (i.e., the character the drawing of which prompts the removal of a previous character). FIG. 8 illustrates three different examples of different levels of recognition at which the device may determine to remove a particular character. In each example, this figure illustrates a handwritten input corresponding to a particular character being removed using a fading mechanism (illustrated by dashed lines) from the handwriting display area. In some embodiments, the characters are immediately removed (without fading), while in other embodiments the characters may be faded, scrolled to the side of the screen, or removed using some other animation.

The first example (stages 810-815) of FIG. 8 illustrates the device immediately fading a character upon recognition that a user's input is for a new character. In particular, stage 810 illustrates that the user has input the handwritten characters "A" and "M" into the handwriting area 850. Likewise, these characters have been recognized and automatically displayed within the text area 840. As in FIG. 7, the characters are faded using a 1-character buffer between the receipt of a new character and the fading of a previous character (i.e., at all times the handwriting area 850 includes a single character between the character being removed and the new character for which input is currently received). However, unlike FIG. 7, in which an input to the right of the character "1" could possibly be related to either the current character (i.e., to transform the "1" to a "k", "t", "H" or various other possibilities) or a subsequent character (i.e., "A1C"), in this particular example, any input received to the right of the character "M" will almost certainly relate to a subsequent character (as opposed to modifying the character "M" to a different character). Accordingly, stage 815 illustrates that upon the receipt of the user's input for the next subsequent character, the device 800 automatically begins to fade the letter "A" from the handwriting area 850. Although this figure only illustrates the "A" in the process of being faded out, in subsequent stages (not illustrated) the "A" would be completely cleared from the handwriting area 850 (or have a partial fading process completed). Stage 815 illustrates that, in this case, the removal of the "A" begins upon receipt of the subsequent character (using a 1-character buffer). At this point, the device 800 begins fading the "A" without having any particular level of certainty as to what the subsequent character will be.

The second example (stages 820-825) of FIG. 8 illustrates the device receiving an input for a subsequent character, but only beginning to fade and remove a previous handwritten input after reaching a higher level of certainty regarding the particular identity of the subsequent character from the first example (e.g., a medium level of certainty). Stage 820 illustrates that the handwriting area 850 has received the characters "A" and "M" and the user is in the process of drawing a 3$^{rd}$ character (which has been recognized by the instantaneous recognition as an "i" in the text area 840). Stage 825 illustrates that the user has now drawn a "P" and thus the device 800 has a higher level of certain regarding the identify of the character than in the first scenario. In particular, the character will likely be one of a "P", an "R", or a "B", whereas the small mark in the first example could result in any number of different characters. As such, upon reaching this higher threshold (mid-level threshold) the device 800 begins the process of fading and removing the "A" from the handwriting area.

The third example (stages 830-835) illustrates the device 800 removing a character only after reaching a still higher level of certainty (e.g., a high level of certainty, such as 75%) as to the identity of the subsequent character (i.e., the user has completed or is about to complete the subsequent character). Stage 830 illustrates the user has drawn the characters "A" "M" and is in the process of inputting a character, which at this point resembles a "P". As such, the text area 840 has recognized the text characters "AMP." However, unlike the second example, the process has not yet begun fading the "A" because the device 800 is not yet at the high-level of certainty regarding the identity of this subsequent character (i.e., this character could be a "P", "B", "R", etc. and none of these possible characters have a high enough certainty level individually. Stage 835 illustrates that the device 800 now determines the user has completed the character "B" and thus has begun the process of fading the "A" from the handwriting area 850. Thus the device 800 removes the character only after determining with the high-level of certainty the particular identity of the subsequent character (the high-level of certainty being reached when a user completes or is about to complete a character). Note that had the user input the "P" and subsequently moved to input a different character, the device 800 would then recognize that the user had completed the character "P" and would start fading out the "A".

FIG. 8 illustrates fading a particular character after reaching different levels of certainty regarding the identity of the subsequent character. In some embodiments, the device may remove a particular character using other mechanisms, for instance, upon a certain timer-based duration after the user has started to input a subsequent character. FIGS. 7-8 illustrate removing a previous character using a 1-character buffer between the character being removed and the receipt of the subsequent character. Different embodiments may user different character buffers (i.e., 0, 1, 2, 3, N) or fractional character buffers between the character being removed and the subsequent character being input. Furthermore, as described below, other embodiments may wait until the input passes a threshold position of the handwriting display area before fading out and/or clearing the display area prior to that threshold position.

Furthermore, some embodiments that use a character buffer will factor in various other factors to determine the particular character buffer. These factors may be based on, for example, the size of the handwriting area of the device, the size of the characters being input by the user (i.e., a user that writes very large letters into the device vs. a user that writes small letters vs. a user that writes average size letters), the amount of clear space remaining in the handwriting area, and various other factors. Thus the device may incorporate these factors when determining the particular manner in which certain handwriting input should be cleared from the handwriting area.

Figure 9:
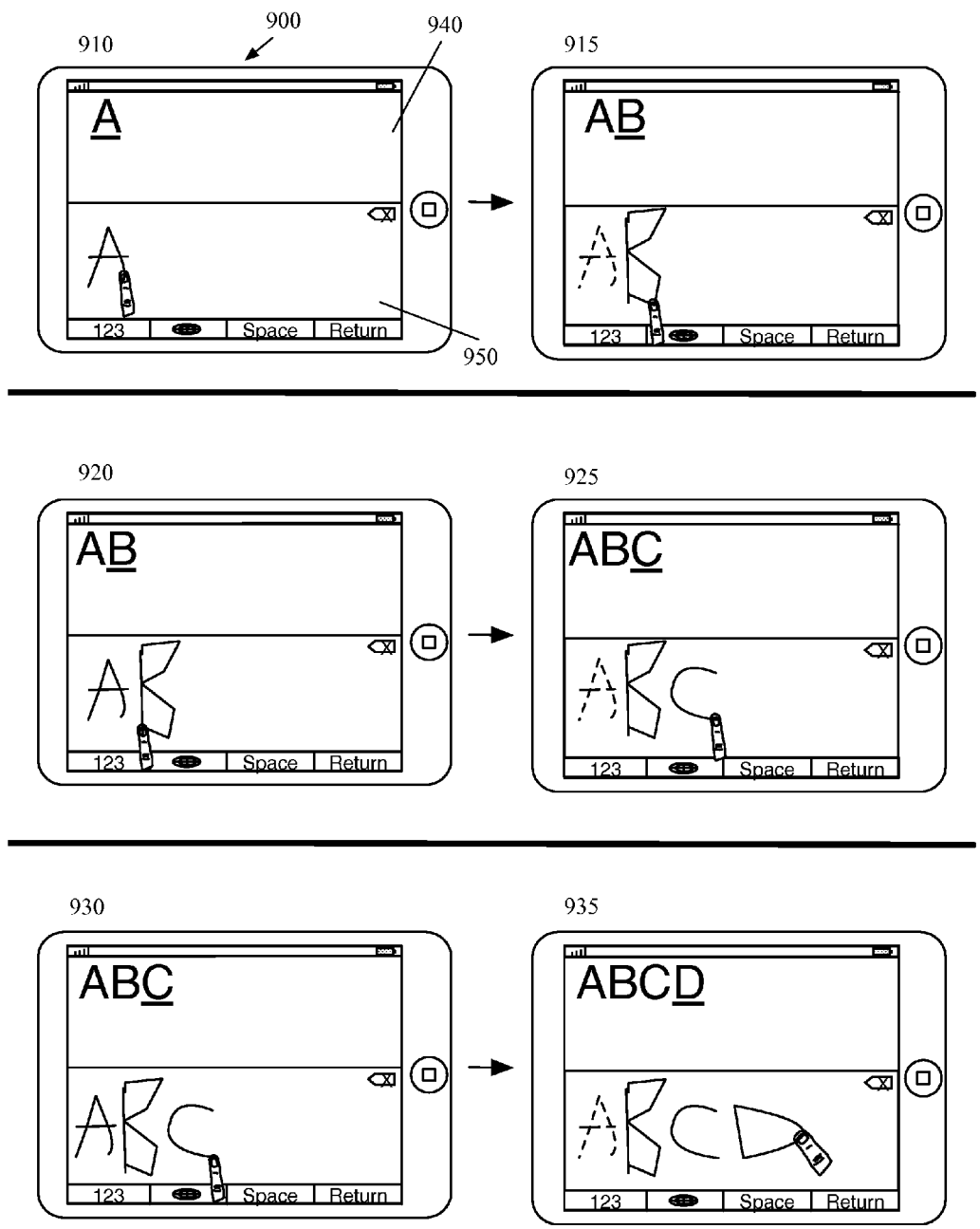
FIG. 9 illustrates examples of the device applying different character buffers when fading a particular character.

FIG. 9 illustrates three different examples of the device applying a different "n" character buffer when fading a particular character. In particular, the first example (stages 910-915) illustrates a zero-character buffer, the second example (stages 920-925) illustrates a one-character buffer (which was used in the examples illustrated in FIGS. 7-8), and the third example (stages 930-935) illustrates a two-character buffer. As noted above, different embodiments may utilize a different number of characters as a buffer between the removed character and the current character (or a buffer that uses a fractional number of characters), and these three examples do not provide an exhaustive list of all of the different possible implementations.

The first example of FIG. 9 illustrates two stages 910-915 of the device 900 in which the device 900 applies a zero-character buffer for determining when to remove a particular character. In particular, stage 910 illustrates the user drawing the letter "A" into the handwriting area 950 and, likewise, the device automatically displaying the corresponding text character "A" in the text area 940. Stage 915 now illustrates the user inputting a "B" into the handwriting area 950. Since this particular embodiment is using a zero-character buffer, the device 900 removes the character "A", thus leaving no character buffer. Note that the device may begin to remove the character "A" at different points in different embodiments, as illustrated above in FIG. 8 (e.g., based on different certainty levels regarding the subsequent character). This example illustrates no character buffer between the particular character being removed and the subsequent character.

The second scenario of FIG. 9 illustrates two stages 920-925 of the device 900 applying a 1-character buffer when removing a character from the handwriting area 950. In some embodiments, the device does not remove a particular character until at least one additional character has been completed after the particular character, and the user has started input for a new, subsequent character. This helps increase the certainty that the user has completed (and is done editing) the particular character. For example, when a user starts to input a third character into the handwriting area, the device can determine with a high level of certainty that the user has most likely finished editing the first character, and thus this character should be removed from the handwriting area.

As illustrated in second example, the first stage 920 illustrates that the user has previously input the characters "AB" into the handwriting area 950. However, unlike stage 915 of the first example, the device 900 has not yet removed the character "A". This is because the device applies a 1-character buffer between the particular character being removed and the subsequent character being received. Stage 925 illustrates the device 900 receiving input for the letter "C" and thus the device 900 starts to remove the "A" from the handwriting area 950 by fading out the character. In this particular scenario, the device 900 maintains a buffer of a single completed character between the particular character being removed and the new character being drawn.

The third example of FIG. 9 illustrates two stages 930-935 in which the device 900 uses a 2-character buffer to determine when to fade out a particular character. In particular, stage 930 illustrates the user has input the handwritten characters "ABC" into the handwriting area 950. However, unlike both examples one and two described above, the device 900 has not yet removed any of the handwritten input from the handwriting area 950. Since this scenario illustrates a 2-character buffer, it is not until stage 935, which illustrates the device 900 receiving a $4^{th}$ letter "D", that the device 900 begins the process of removing the character "A" from the handwriting area 950 by fading out the drawing of this character. For devices that provide a larger amount of screen space for receiving a handwritten input, the device may apply a higher character threshold since a user will likely have more room to continue to input characters prior to returning to the beginning of the handwriting area. For example, a smart-phone may only provide a handwriting area capable of receiving 3-5 characters whereas a tablet or other larger device may receive, for example, 10 or more characters depending on the size of the screen space.

Figure 10:
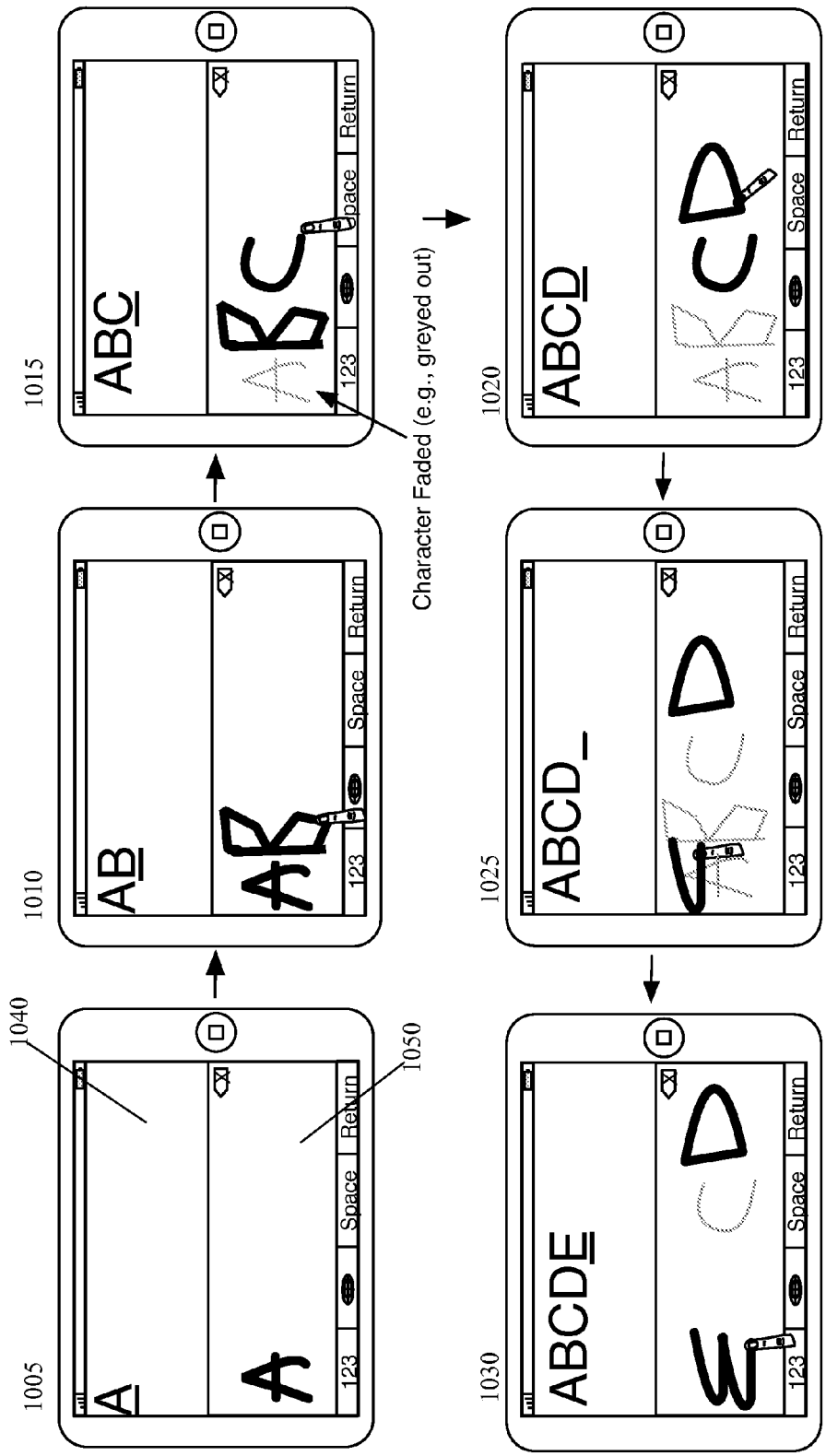
FIG. 10 illustrates an example of the device applying a one-character buffer when fading a character and the subsequent clearing of certain faded character(s) upon receipt of a user's input over the particular faded characters.

FIG. 10 illustrates, over six stages 1005-1030, an example of the device using a one-character buffer. However, rather than remove characters completely based on the one-character buffer, the device displays characters as faded out until the user begins providing new handwriting input over the faded out character. The first stage 1005 illustrates the user drawing the letter "A" into the handwriting area 1050 and, likewise, the device automatically displaying the corresponding text character "A" into the text area 1040. Stage 1010 illustrates the user has now also input a "B" into the handwriting area 1050. Since this illustrated embodiment uses a one-character buffer, the device 1000 has not yet faded out the character "A" in the handwriting display area.

Stage 1015 illustrates that the user has input a "C" into the handwriting area, and thus the device has faded out the display of the character "A", leaving a one-character buffer between the most recently faded character and the newly received character. As described above by reference to FIG. 8, the device may choose to fade out the display of the character "A" at different points during the drawing of the character "C" in different embodiments (e.g., based on different certainty levels regarding the newly received character). Stage 1020 further illustrates the one-character buffer; in this case, the user has now input a "D", which causes the device to partially fade out the character "B" (i.e., by graying it out). Unlike the above examples in which the device completely removes characters from the handwriting area, this example illustrates that in some embodiments the device does not remove the faded out characters until it receives a subsequent input over the faded out character or set of characters.

In particular, stage 1025 illustrates the user providing input for a new character, that looks like the top portion of the letter "E", over the faded out characters "A" and "B". Accordingly, once the device detects input over these faded out characters, the device completely clears these faded characters from the handwriting area 1050. Stage 1030 illustrates that the user has now finished drawing the character "E" and the device has completely removed the faded out characters "A" and "B" from the handwriting area. Furthermore, the device still displays the faded character "C" and the active (i.e., non-faded and editable) character "D", as this character is serving as the buffer between the most recently removed character "C" and most recently drawn character "E". As such, the user may still modify the "D" if desired. Although in this example, only the "A" and "B" (the faded out characters over which new content is drawn) are removed from the display, some embodiments clear all of the faded out characters ("A", "B", and "C") from the handwriting area or all of the characters, whether faded out or not ("A", "B", "C", and "D")

Figure 11:
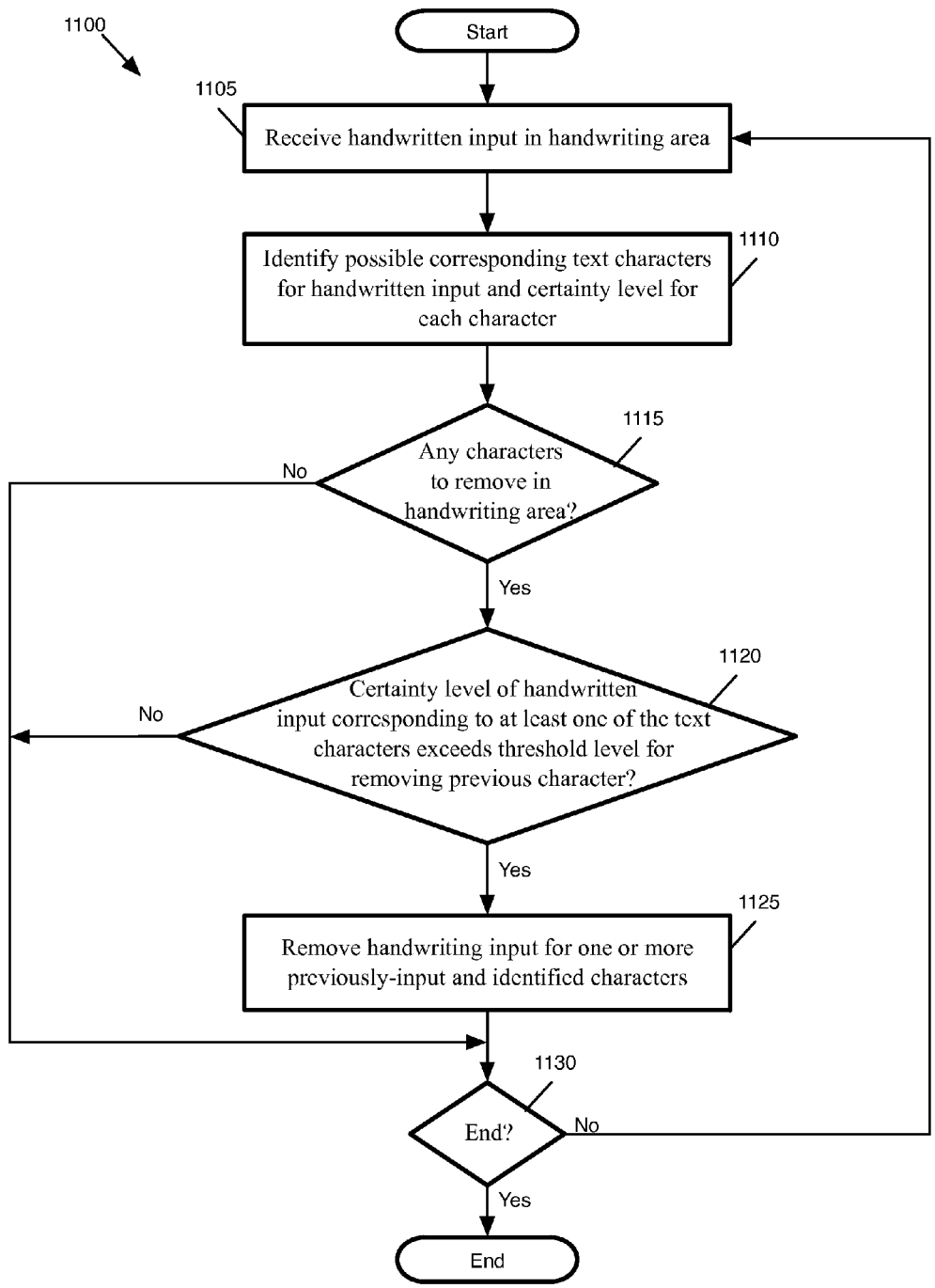
FIG. 11 illustrates a process for removing handwritten input from a handwriting area of the device.

FIG. 11 illustrates a process for removing handwritten input from a handwriting area of the device. In some embodiments, the process is performed by the device on which the handwriting is received (e.g., by an operating system of the device, an application or other software of the device, firmware of the device, etc.). As shown, the process begins by receiving (at 1105) a handwritten input in a handwriting area of a device. The input may be a touch input on a touch sensitive display of the device or input from a stylus, etc. In some embodiments, the input is received in a specific region of the touch sensitive screen, identified as a handwriting input area in the graphical user interface displayed on the screen.

Upon receiving this input, the process identifies (at 1110) possible corresponding text characters for the handwritten input, and a certainty level for each identified character. As described above by reference to FIG. 5, the certainty level may be different based on how close of a match there is between the handwritten input to the corresponding text character. In some embodiments, the certainty levels are calculated as probabilities that the user intends the handwriting input to correspond to a particular character. Thus, in some embodiments, all of the identified certainty levels for the possible characters add up to 100%. For example, in the first example of FIG. 5 (stages 510 and 515), the device might identify a slash ("/") with a 20% certainty level, an "A" with a 15% certainty level, each of an "M" and "N" with 10% certainty levels, and various other characters each at a 5% certainty level. In order to calculate these probabilities, some embodiments take into account the direction of the stroke (or strokes), the context within other characters (e.g., whether the letter fits into a known word when combined with previous characters), whether the user has started drawing a next character, etc.

In some embodiments, the first and second operations 1105 and 1110 are the same as the first and second operations 605 and 610 of the process 600 shown in FIG. 6. In some embodiments, the device (i.e., the operating system, application, etc. operating on the device) performs these two processes together. Specifically, the device of some embodiments calculates certainty levels for handwriting input and then, in parallel determines (i) whether to display a recognized character for the input and (ii) whether to remove a previously-input character from the handwriting area. To perform these operations, some embodiments first calculate the possible text characters and certainty levels for a handwritten input, then call two separate functions that perform these two operations.

The process 1100 then determines (at 1115) whether there are any characters in the handwriting area that could be removed. As mentioned, in some embodiments the device removes characters by applying a buffer of a particular number of characters between a removed character and a currently input character. In such simple cases, the process simply determines whether the requisite number of characters are on the screen yet. In other embodiments, the process determines the number of characters in the buffer based on the ratio of handwritten character size to screen space, and then determines whether this calculated requisite number of characters are yet on the screen. For instance, the device might calculate the number of characters required to fill half of the horizontal space, and use this as the number of characters in the buffer between the removed character and the currently input character. Some embodiments use a sliding buffer based on the fraction of screen size by, e.g., measuring from the left-most portion of the first character remaining in the handwriting area to the right-most portion of the character currently being drawn (for left-to-right languages). When this distance (or a similarly-calculated distance) exceeds a particular percentage of the width of the handwriting area (e.g., 30%, 50%, 75%, etc.), the device removes the leftmost character. Depending on the characters drawn, the number of characters in the buffer could change during a handwriting session, and two or more characters might be removed at once.

When there are enough characters to consider removal, the process determines (at 1120) whether the certainty level of the current handwritten input corresponding to at least one of the text characters exceeds the threshold level for removing a previously input character. In some embodiments, this operation simply determines whether it is more likely than not that the current handwriting input corresponds to a new character rather than a modification to a previously-identified character. As shown in FIG. 8, different embodiments require different levels of certainty in a current character before removing an earlier character. Some embodiments require almost no certainty, whereas others require much higher levels (e.g., 75% or greater).

If this threshold level is satisfied (and there are enough characters drawn for one to be removed), then the process removes (at 1125) from the handwriting area the handwriting input corresponding to a character (or multiple characters) identified for removal. As indicated, some embodiments animate the removal of this character (e.g., by fading out the input, by sliding the character off of the handwriting area, or by other animation), or only partially remove the character (e.g., by fading the input to a light gray).

When either of these conditions are not met, or after the identified handwriting input has been removed, the process determines (at 1130) whether to end. The process may end if, e.g., the user ends the application for which the handwriting input is used, the device is shut off, etc. Furthermore, the user might end the handwriting operations by, e.g., sending a text message or e-mail, exiting out of a note or other document, or otherwise completing the handwriting operation. One of ordinary skill in the art will recognize that this is a conceptual operation, and the process does not generally ask itself repeatedly whether or not to end, but rather is terminated upon the occurrence of certain events. If the application executing on the device continues to do so, the process returns to 1105 to wait for subsequent handwritten input. Otherwise, the process ends.

Figure 12:
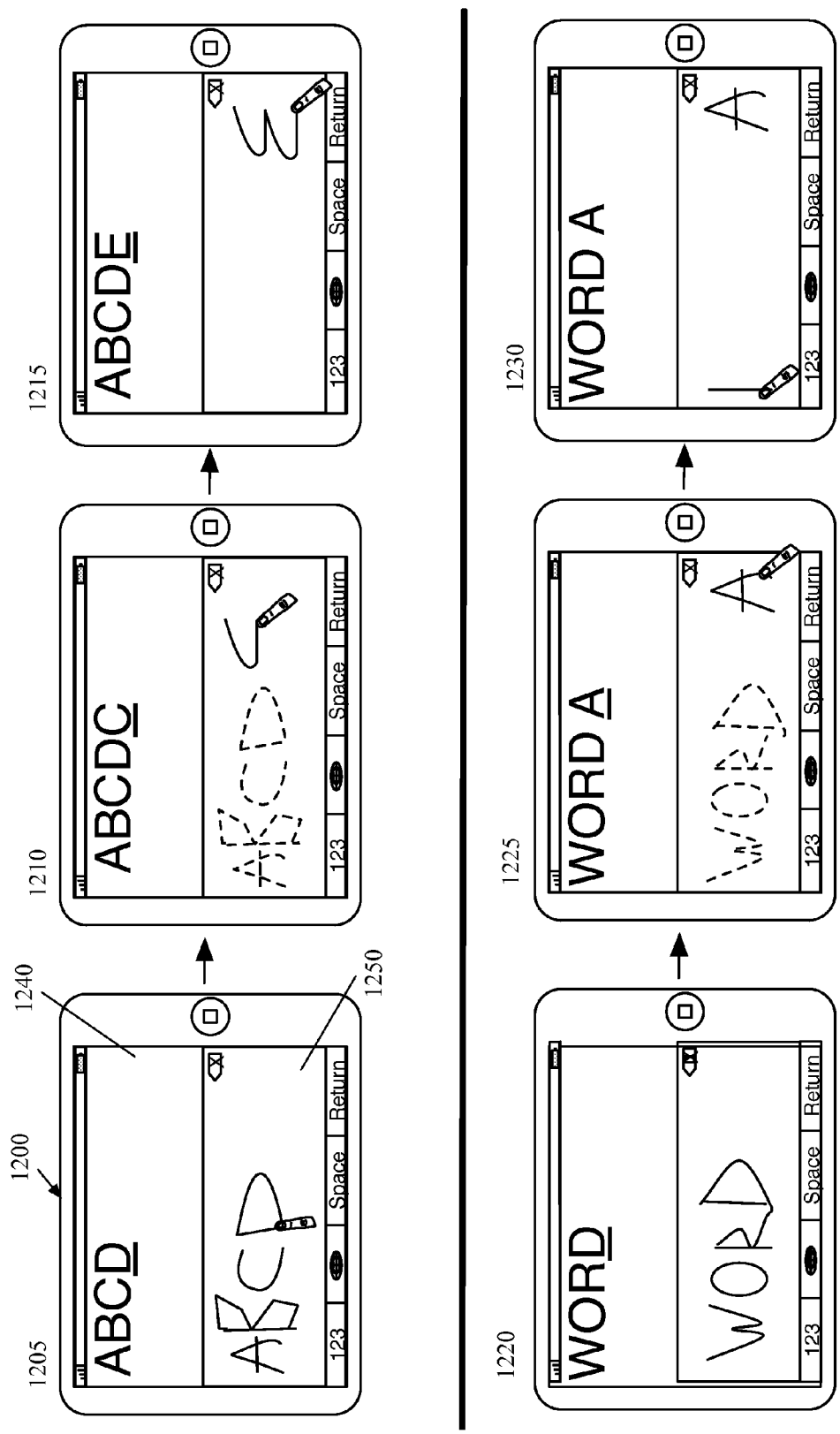
FIG. 12 illustrates examples of the device removing multiple characters.

The above examples primarily describe embodiments in which a single character is removed at a time (using, e.g., a fixed number of characters as a buffer between a currently-drawn character and a removed character). In some embodiments, the device may apply removal conditions that cause the removal of handwritten input for more than a single text character at a time. For example, the device may remove two, three, etc. characters at a time. Furthermore, some embodiments may remove all characters of a completed word at the same time. In particular, for devices such as tablets that provide a sufficient screen space to input many words, the device may remove sets of characters on a word-by-word basis. FIG. 12 illustrates two examples of the device removing multiple characters. In particular, the first example (stages 1005-1215) illustrates a multi-character removal while the second example (stages 1220-1230) illustrates removal of a set of characters that have been recognized as a completed word.

The first example of FIG. 12 illustrates three stages 1205-1215 of the device 1200 in which several characters are removed at once from the handwriting area 1250. In particular, stage 1205 illustrates the device receiving handwritten input corresponding to the characters "ABCD". As such, the device 1200 has automatically displayed the recognized corresponding text characters in the text area 1240. Stage 1210 illustrates the device 1200 now receiving a subsequent character that has been recognized at this particular point as a "C". Furthermore, the device 1200 is removing (i.e., fading out) multiple characters "ABCD" from the handwriting area 1250 (rather than a single character as described above). Stage 1215 illustrates the user has input the character "E" and the device 1200 has completely cleared the letters "ABCD" from the handwriting area 1250. Accordingly, since the user is near the end of the handwriting area 1250, the user can continue to provide handwriting input by shifting back to the beginning (i.e., left-hand portion) of the handwriting area 1250, which has now been cleared and is available for the user to provide handwritten input. In some embodiments, the device waits until the user is drawing the last character that will fit on the display, then removes all of the previous characters so that the user can start drawing from the left (or right side, for right-to-left languages) again with a clean slate.

Similar to removing several characters as in example one described above, some embodiments may remove characters that correspond to a completed word. In particular, for devices that provide a large enough handwriting input area that is capable of receiving multiple words (e.g., an iPad® or other tablet device), the device may fade characters on a word-by-word basis (e.g., after a word has been recognized by the device, and the user begins drawing characters for the next word).

The second example of FIG. 12 illustrates three stages 1220-1230 of the device 1200 in which the device 1200 removes a word from the handwriting area 1250 upon recognition of the word and the subsequent receipt of a character for a different word. In particular, stage 1220 illustrates the user has input the word "WORD" into the handwriting area 1250. The device 1200 may compare these characters to an internal dictionary or other resource to determine whether a word has been input. Furthermore, the device may recognize that the user also intends to input a space between the word and the next character in order to recognize that the word has been completed (i.e., the user is not going to continue to modify the term to another valid word such as "WORDS"). The second stage 1225 of this example illustrates that the user has input the character "A", leaving a detectable gap between the "D" of "WORD" and the "A". Based on this gap and/or the recognition of "WORD" as a valid word and "A" as the start of a new word, the device 1200 has recognized the completed word "WORD" and begins the process of removing this set of characters from the handwriting area 1250. Accordingly, the user is able to continue to input words in this now cleared area, as illustrated by stage 1230. At this stage, the handwritten input corresponding to the characters "WORD" have been removed from the handwriting area 1250 and the user is continuing to provide handwritten input in this now cleared input area.

In some embodiments, the device may utilize other thresholds for determining when to clear the handwriting area. For example, the device may apply a location-based threshold such that once a user has input beyond a certain threshold, the device may be triggered to clear a portion of the screen space. Other embodiments may apply a timer-based threshold, such that a character that has been recognized and ideal for "n" number of seconds is automatically cleared from the handwriting area. Some embodiments may utilize a combination of any one of a character, location, and timer based thresholds in determining the particular manner in which to clear handwritten input from the handwriting area of the device.

Figure 13:
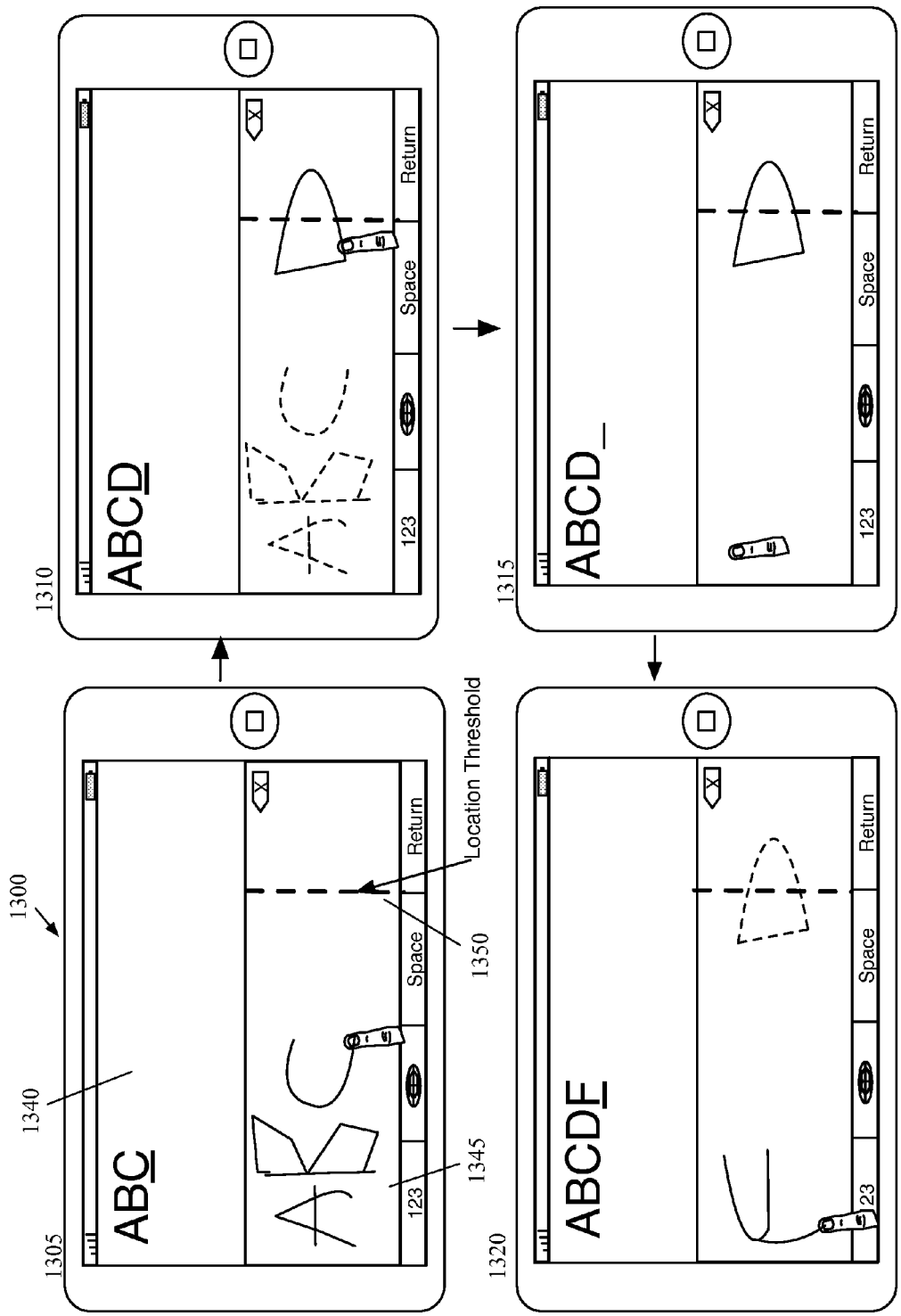
FIG. 13 illustrates the application of a fixed location-based threshold for removing handwritten input from the handwriting area of a device.

FIG. 13 illustrates the application of a fixed location-based threshold for removing handwritten input from the handwriting area of a device. In particular, this figure illustrates four stages 1305-1320 of the device 1300 removing handwritten input that is located before a particular threshold location on the screen. Stage 1305 illustrates the device 1300 which includes the handwriting area 1345 and the text area 1340. For illustrative purposes, the particular location threshold 1350 is indicated by the dashed line across the handwriting area 1345, but this may not be visible to the user of the device 1300. Stage 1305 illustrates the device 1300 receiving handwritten input for the character "C", after having previously received input for characters "A" and "B". The input for all three of these characters is located prior to (i.e., to the left of) the particular location threshold 1350.

The second stage 1310 illustrates the user drawing the character "D", which crosses over the location threshold 1350. When the user input crosses the location threshold 1350 (i.e., in order to draw the rounded portion of the letter "D"), the device 1300 identifies that the user has drawn to the right of the location threshold 1350. This triggers the device 1300 to remove the handwritten characters "ABC" that are displayed before this particular threshold 1350. Some embodiments use such a threshold because once the user crosses this threshold, the user is likely to be approaching the end of the handwriting area, and therefore will want to continue providing input at the beginning of the area. As such, the device clears this beginning portion in order to allow the user to continue providing handwritten input. Similarly, for left-to-right languages, the device uses a threshold location towards the left side of the handwriting area and removes input at the right side, or beginning of the handwriting area.

As a result, the third stage 1315 illustrates that the handwritten input for the characters "ABC" has been removed from the handwriting area 1345. Furthermore, the user has begun to draw a new character in this now cleared space. Stage 1320 illustrates the user having input the character "F", which causes the device 1300 to begin the character removal process for the letter "D". In some embodiments, once the user has completed a character at the beginning of the handwriting area (or completed a character with at least a threshold certainty), the device removes the characters to the right of the location threshold. In some embodiments, the handwriting area includes two location thresholds. In addition to the threshold 1350, some embodiments include a second threshold towards the beginning of the handwriting area. Once the input crosses this second threshold, the device begins removing any remaining characters that either cross the first threshold 1350 or are to the right of the first threshold (i.e., the "D" in the above example).

Some embodiments may apply a combination of location based and character based thresholds. For example, the device may apply a buffer of one character (i.e., removing a particular character once the user starts drawing a character two to the right of the particular character), but if the input reaches a certain location (e.g., if the user draws very large characters), then the device may remove the previous handwritten input without the buffer (i.e., remove the character directly previous to the currently-drawn character). Furthermore, in some embodiments, the device may also utilize a timer or duration based threshold for determining when to remove handwritten characters from the handwriting area of the device.

Figure 14:
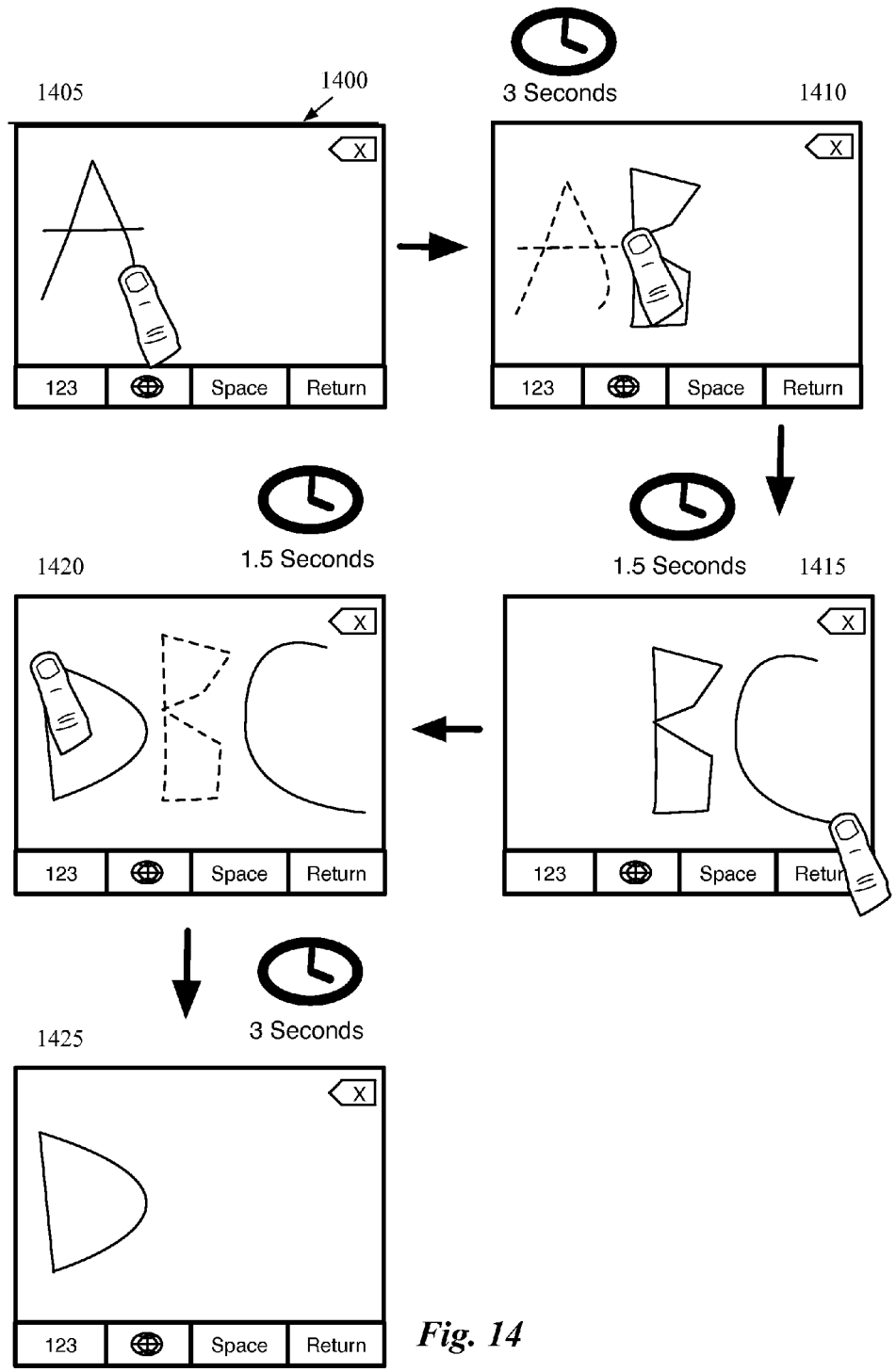
FIG. 14 illustrates a device applying a timer-based threshold when determining whether to remove handwritten input from the handwriting area of the device.

FIG. 14 illustrates five stages 1405-1425 of a device in which the device applies a timer-based threshold when determining whether to remove handwritten input from the handwriting area of the device. The first stage 1405 illustrates a user drawing a character "A" in the handwriting area 1400. For simplicity of explanation, this figure does not illustrate a text area. However, one of ordinary skill in the art will recognize that the time-based removal illustrated in this figure could exist for a UI like those shown in the previous figures, in which recognized characters are displayed in a text area.

The second stage 1410 illustrates that the user has now drawn a subsequent character "B". Furthermore, as indicated by the timer above the handwriting area 1400, 3 seconds have elapsed since the device recognized the start of the input for this subsequent character. As this example uses a 3-second timer, the device has now begun removing the previous character "A" from the handwriting area 1400 (e.g., using a fade out animation). Different embodiments may specify different time-based thresholds for the removal of characters from the handwriting area 1400 (e.g., 5 seconds, 10 seconds, etc.).

The third stage 1415 illustrates the user drawing a "C". Whereas the drawing of the "B" took 3 seconds and therefore prompted the removal of the "A", in this case only 1.5 seconds have elapsed since the user started drawing the new character "C". As such, the device has not yet started removing the character "B". At the fourth stage 1420, the user has drawn a "D", which also has taken 1.5 seconds. As the timer is now at 3 seconds since the user started drawing the "C", the device removes the "B" at this point.

Lastly, the fifth stage 1425 illustrates the handwriting area 1400 3 seconds after the user completed drawing the "D". By this point, the "C" has been completely removed (assuming an animation time of less than 1.5 seconds) based on a 3-second timer from the commencing of the drawing of the character "D". However, because the user has not started drawing a character after the "D", the device has not removed the "D" from the handwriting area 1400.

In this example, the device initiates a timer for removing a first character one the user has started the input for a second character. In some embodiments, the device waits to initiate the timer until the second character is recognized, which gives the user more time to go back and edit the first character. In some embodiments, the user may specify the duration of the time using, for example, a settings menu. In other embodiments, the device automatically determines the timer duration by analyzing the speed at which the user is inputting characters. In addition, some embodiments apply the timer in combination with one or more of the other thresholds (i.e., character, location, etc.).

Figure 15:
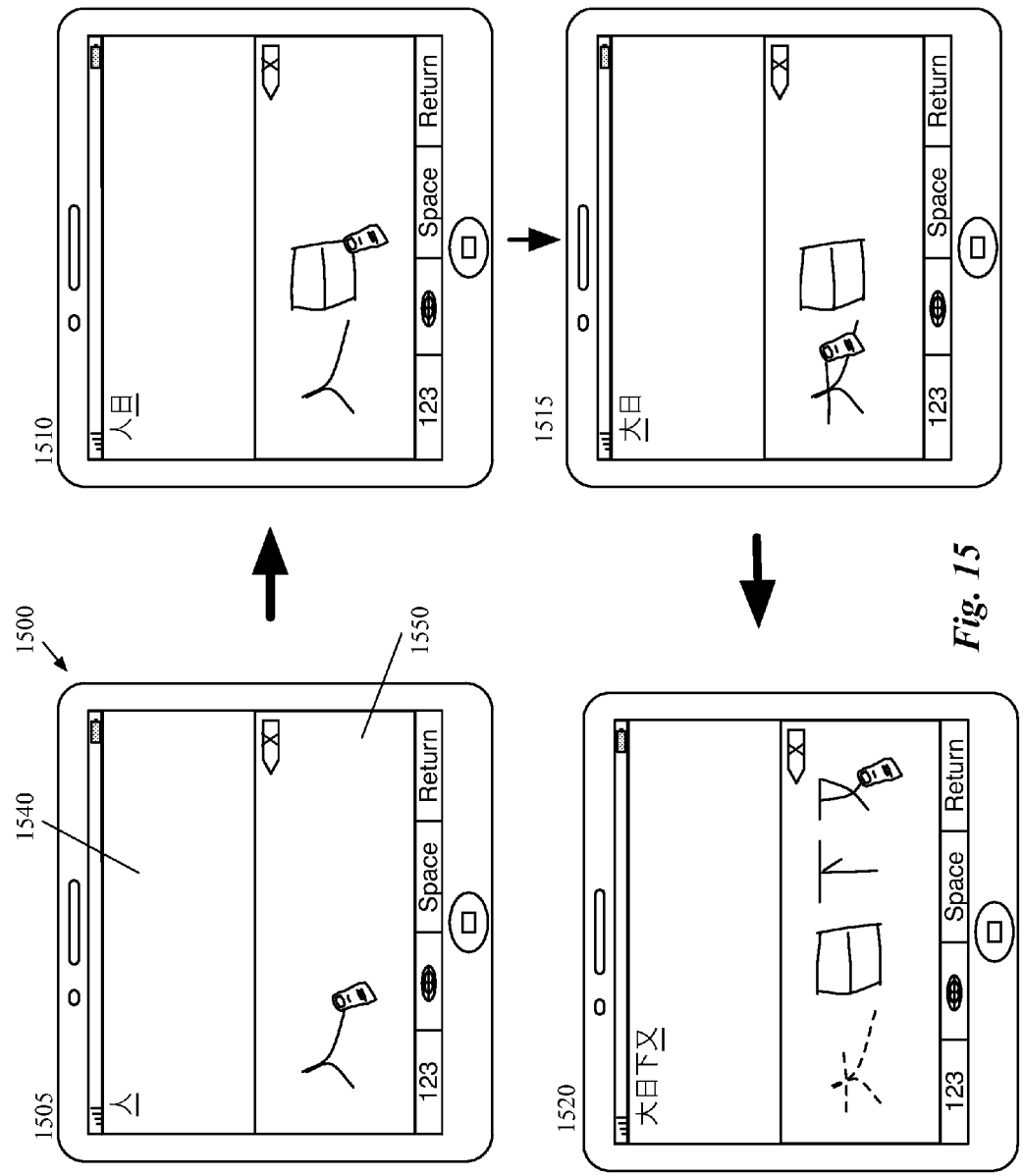
FIG. 15 illustrates a user modifying handwritten input for a previous character, even after providing handwritten input for a subsequent character.

However, in some embodiments that apply character or location based thresholds for determining when to remove a character from the handwriting area, the device allows a user to modify characters while avoiding placing any sort of timer-based constraints on the user. As described above, this is particularly useful in certain languages (e.g., Chinese) that generally require more time and detail for each character. FIG. 15 illustrates one benefit of applying a character-based threshold (i.e., a buffer of one or more characters before removal of a previous character), in that this allows a user the opportunity to modify handwritten input for a previous character, even after providing handwritten input for a subsequent character. In particular, FIG. 15 illustrates four stages 1505-1520 of a device 1500 in which a user inputs several Chinese characters and then returns to modify the input for one of the previous characters.

The first stage 1505 illustrates the user inputting a first Chinese character "人" in the handwriting area 1550, which has been recognized by the device 1500 and displayed in the text area 1540. The second stage 1510 illustrates the user inputting a second Chinese character "丨丨", which the device 1500 has also recognized.

After inputting the second character, the user decides to modify the first character "人" in the third stage 1515. Specifically, the user adds a horizontal stroke through the top of the first character, causing the device 1500 to now recognize the first character as the Chinese character "大". Even though the user had begun (and, in fact, completed) drawing the second character, the device 1500 allows the user to return to the first character and continue modifying this first character. In some embodiments, the user could have drawn part of the second character, returned to modify the first character, and then subsequently completed drawing the second character.

In this example, the device 1500 does not begin to remove any of the handwritten input until the user has drawn several characters in the handwriting area 1550. Specifically, as illustrated in stage 1520, the device 1500 utilizes a 2-character buffer (i.e., with two characters between the character being removed and the character being input). The fourth stage 1520 illustrates that the user has drawn two more characters "下又", and the device 1500 has made the determination to fade the character "大" from the handwriting area 1550 (e.g., upon the user providing the input for the character "又", or upon the device 1500 recognizing this character with a threshold level of certainty. By not pressuring the user to input characters at any particular pace, the device allows the user to spend as much time as necessary to draw the handwritten characters correctly, which is particularly useful in languages that use characters to represent words (e.g., Chinese), as compared to alphabet-based languages (e.g., English) with a much smaller number of total characters.

The above examples all illustrate embodiments in which the user provides input in a handwriting area and the device (e.g., the software operating on the device) recognizes the characters drawn by the user. In these examples, the user must draw the characters with enough exactness that the device identifies the correct character. In some embodiments, the device combines the recognition feature (i.e., displaying the character with the highest calculated certainty level in the text area) with a display of selectable keys for additional candidate characters. In some embodiments, the additional candidate characters are those that have the second, third, etc. highest calculated certainty levels for the currently-drawn character. This feature is particular useful for those situations when two or more candidate characters have very similar appearances (e.g., the letters "l" and "I" and the number "1", or the letter "B" and the number "8").

In addition, the device may provide a completed word as a selectable candidate key, based on auto-completions of words that the user likely intends based on their input. This provides the user with the ability to select these auto-completions in order to avoid the time-consuming effort of writing out every individual character in the word. For example, after the user has entered handwritten text for a part of a word, the device can display as a candidate the completed word. Some embodiments leverage the auto-complete features provided for an existing touchscreen keyboard on the device. However, where the existing auto-complete determines possible words that a user might be typing based on proximity of a selected character to other possible characters on the keyboard (e.g., if a user selects a "R" but intends to select a "T"), the auto-complete feature of some embodiments for handwriting input identifies different possibilities for each character based on the stroke (e.g., for character that might be either a "1" or a "l".

Figure 16:
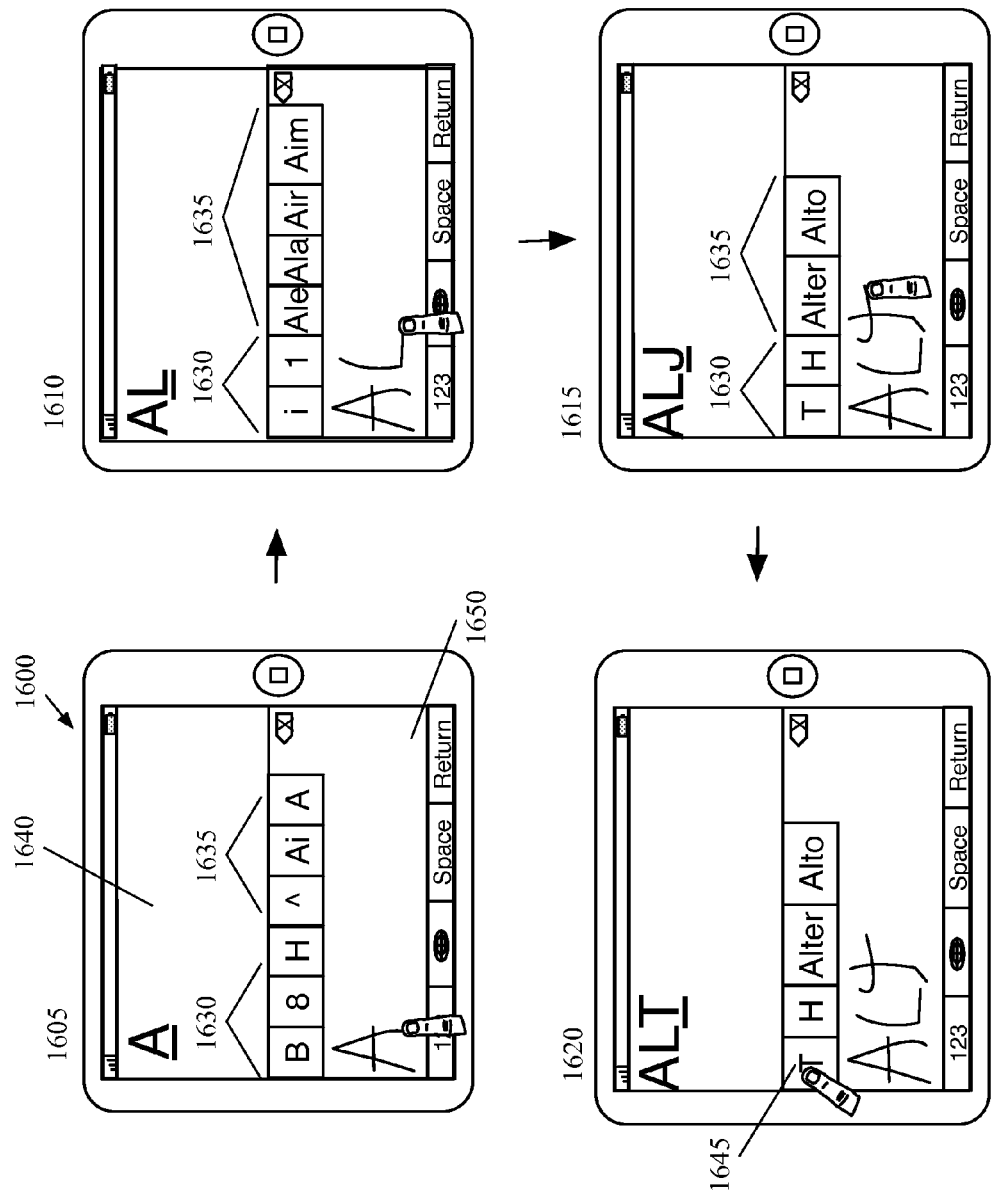
FIG. 16 illustrates the presentation of selectable GUI items for alternative characters to a recognized character for current input, as well as for potential autocomplete candidates.

FIG. 16 illustrates in four stages 1605-1620 of a device 1600 the presentation of selectable GUI items for alternative characters to a recognized character for current input, as well as for potential autocomplete candidates. The first stage 1605 illustrates the user drawing the character "A" within the handwriting area 1650. As the user draws this character, the device 1600 compares the handwritten input to characters and words in a dictionary, corpus, repository, or the like. For example, the device can compare the handwritten input against English characters and words formed from English characters. Characters or words in the dictionary that include an initial character matching or resembling the handwritten input can be identified as candidates.

To identify both the recognized character in the text area (i.e., the "A") as well as the additional alternative characters, some embodiments perform the process 600 of FIG. 6, or a similar process. The character with the highest certainty level is displayed in the text area, while characters with the next highest certainty levels are displayed as selectable character keys. Some embodiments require that the characters have at least a threshold certainty level (e.g., at least 5%) in order for the device to display the characters as selectable alternatives. In addition to the techniques discussed above, some embodiments use the frequency of the character in previous handwriting sessions on the device, the degree of match to previous characters drawn using the handwriting feature of the device, etc. To identify the autocomplete terms for presentation as selectable items, some embodiments calculate probabilities for different terms in the dictionary, corpus, etc., and present the most likely candidates.

In some embodiments, the device presents the candidate keys in an order based on the calculated probabilities. For instance, the most likely characters might come first, followed by the most likely autocomplete terms. In this example, at stage 1605, the best candidate "A" is displayed in the text area 1640, with alternative characters "B", "8", "H", and "^". Furthermore, possible autocomplete terms shown include "Ai" and "A". While this example presents the selectable items 1630 for the alternative characters and the selectable items 1635 for the autocomplete as appearing the same, some embodiments differentiate between the two types of items. For instance, some embodiments locate the two types of selectable items in different locations in the GUI (e.g., the left side vs. the right side, one on top of the other, etc.), or differentiate the appearance of the two sets of selectable items (e.g., with different colors, shapes, etc.).

Whereas a selection of one of the first set of selectable items (alternative characters) results in a change to the character displayed in the text area 1640 corresponding to the currently input character, a selection of one of the second set of selectable items (autocomplete terms) results in a change to the entire word currently displayed in the text area 1640. Such a selection of an autocomplete term may change the current character and previous characters, as well as add characters not yet drawn (thereby preventing the need to draw these characters).

Furthermore, in some embodiments a user can scroll through the set of selectable items for candidate characters and/or autocomplete terms using gestures. For example, some embodiments allow the user to scroll through the selectable items by performing swipe gestures that scroll the items to the right or left (depending on the direction of the gesture), thereby presenting new selectable items for other candidates.

The second stage 1610 illustrates that the user has completed the input of the "A" and has now input a second character "L". At this point, the device 1600 presents the user with selectable items for two alternative candidate characters ("i" and "l"), as well as for four autocomplete terms ("Ale", "Ala", "Air", and "Aim"). The third stage 1615 illustrates that the user has continued inputting a third character, which the device 1600 recognizes as a "J". Two alternative character candidates ("T" and "H") are provided as selectable items, as well as two autocomplete terms ("Alter" and "Alto"). While the device 1600 recognizes the current handwritten character as a "J", none of the autocomplete terms actually include this character. This is due to the paucity of words that begin "ALJ", whereas several words begin with the letters "ALT".

Stage 1620 illustrates the user selecting the "T" candidate key 1645 (e.g., using a tap gesture over the selectable item). As shown, this causes the device 1600 to modify the character shown in the text area from a "J" to the selected "T". In some embodiments, the device 1600 subsequently removes the selectable items 1630 and 1635 for the alternative character candidates and autocomplete terms, once the user has selected one of them.

The above examples only illustrate a user editing characters that are still displayed on the screen (i.e., have not yet been removed from the handwriting area of the GUI. In some embodiments, even after a character has been removed from the handwriting area (e.g., faded out, scrolled off the screen, etc.), the device allows a user to return that character to the display (e.g., to apply further modifications). In some embodiments, the GUI provides a "delete" or "backspace" selectable item. When the user selects this item, the device displays at least one previously removed handwritten character, which the user can then edit. This feature may also be used to simply clear out the input for a current character, if the user has incorrectly drawn that character.

Figure 17:
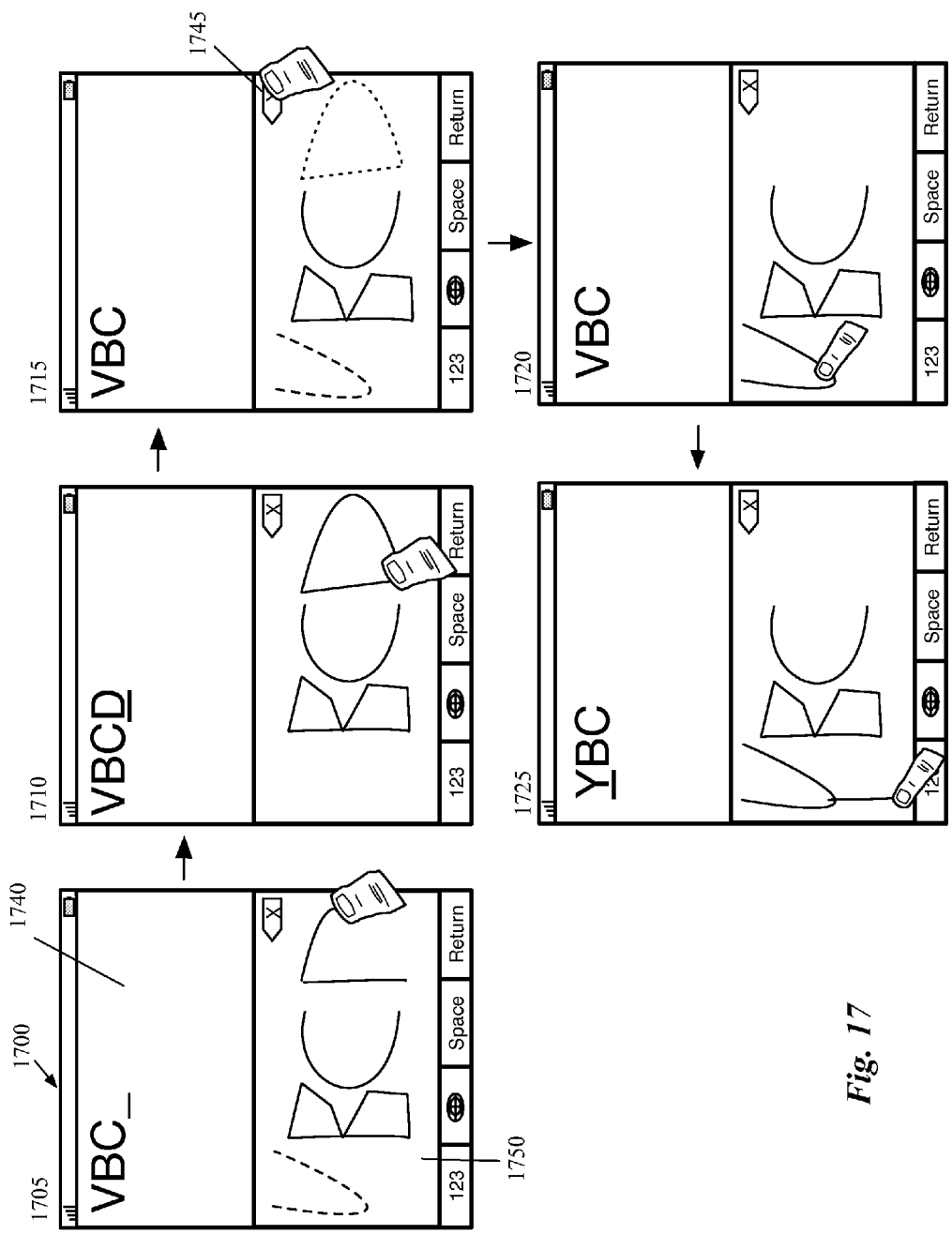
FIG. 17 illustrates a selectable item to return previously removed characters to the handwriting display area.

FIG. 17 illustrates five stages 1705-1725 of a device 1700 in which a user uses a selectable item to return previously removed characters to the handwriting display area 1750 and modify one of those characters. As shown at stage 1705, the user is currently in the process of drawing a fourth character "D", having previously drawn the characters "VBC". At this juncture, the device 1700 is in the process of removing (e.g., by fading out) the letter "V" from the handwriting area 1750 (e.g., using a two-character buffer between the removed character and the currently-drawn character). The second stage 1710 illustrates that the user has completed drawing the letter "D", and the device 1700 has completely removed the input for the letter "V" from the handwriting area 1750. The text area 1740 now displays the characters "VBCD".

At the third stage 1715, the user selects a "delete" or "backspace" virtual key 1745 (e.g., using a tap input over this selectable item in the GUI). As shown, this causes the device 1700 to (i) remove the input for the most recently-drawn character (i.e., the "D" in the example), and (ii) re-display the input for the most recently removed character (i.e., the "V" in the example) from the handwriting area 1750. In some embodiments, the device 1700 fades out the deleted character input while fading in the re-displayed character input, or performs other animations in order to display one character while removing the other.

The fourth stage 1720 illustrates that the user is editing the "V". At this point, the "D" has been completely removed while the V has been completely re-displayed (i.e., any animation has completed). The fifth stage 1725 illustrates that the user has added a stroke to the "V", such that the device 1700 recognizes this first character as a "Y" and modifies the character in the text area 1740 of the GUI.

Figure 18:
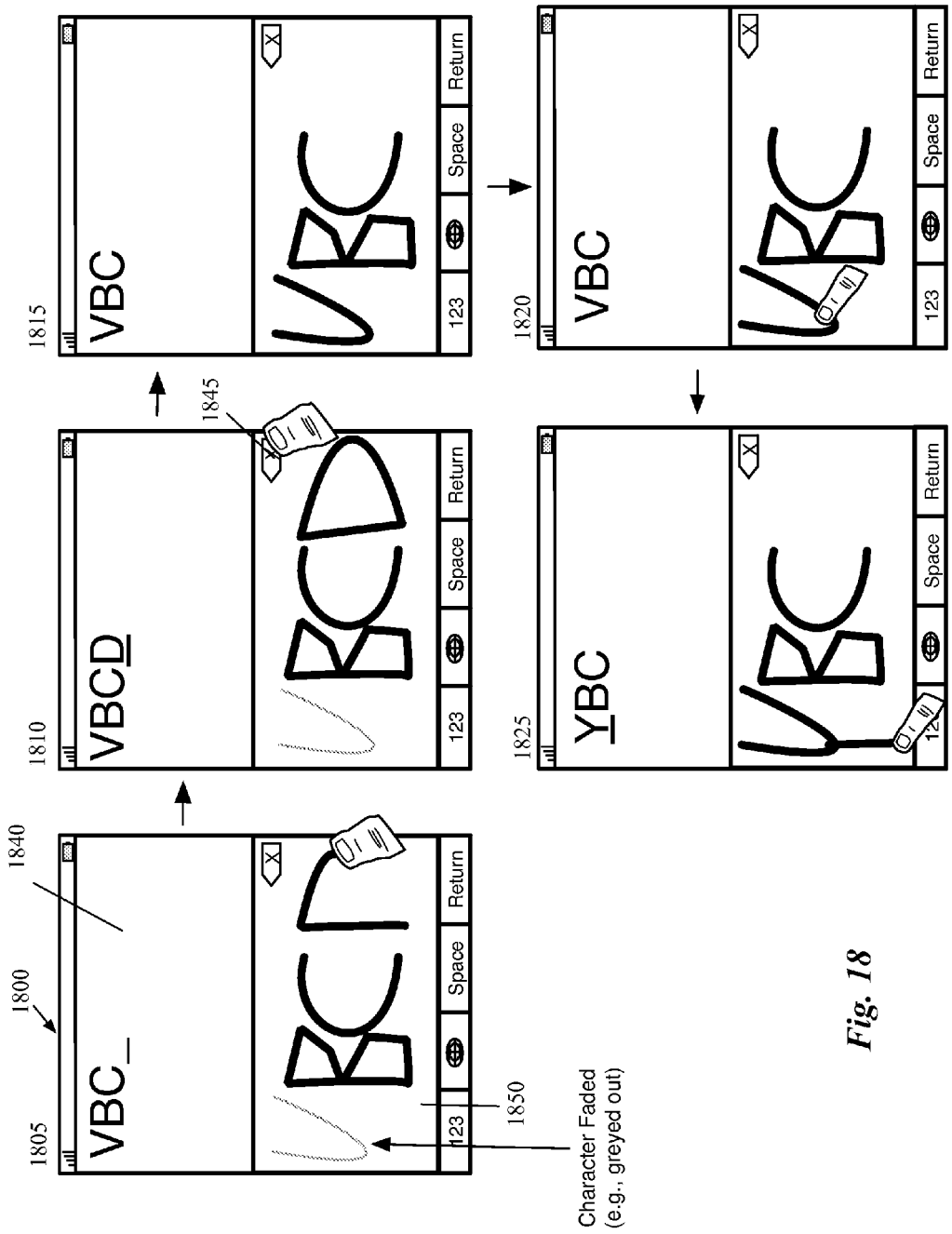
FIG. 18 illustrates an example of using the delete key in an embodiment that initially fades characters and subsequently removes the faded characters upon receiving a new input over the faded characters.

As described above, rather than removing characters before a portion of the handwriting area is reused, some embodiments fade out the display of handwritten characters, and do not remove these characters until subsequent input is detected over the faded out character. FIG. 18 illustrates an example, similar to the example in FIG. 17, of using the delete key in an embodiment that initially fades characters and subsequently removes the faded characters upon receiving a new input over the faded characters.

FIG. 18 illustrates five stages 1805-1825 of a device 1800 in which a user uses a selectable item to fade back in faded out (e.g., grayed out) characters to the handwriting area 1850 and modifies the character. As shown at stage 1805, the user is currently in the process of drawing a fourth character "D" having preciously drawn the characters "VBC". In this example, the device has faded out the character "V" (i.e., the device displays the character as faded out) in the handwriting area (e.g., using a two-character buffer between the most recently faded out character and the currently-drawn character).

The second stage 1810 illustrates that the user has completed drawing the letter "D", but selects the delete virtual key 1845 (e.g., using a tap input over this selectable item in the GUI). As shown in stage 1815, this causes the device 1800 to (i) remove the input for the most recently-drawn character (i.e., the "D" in the example), and (ii) fade back in the most recently faded out character (i.e., the "V" in the example) in the handwriting area 18050. Now that the "V" has been faded back in as an active handwriting character, the device can receive modifications to this character.

The fourth stage 1815 illustrates that the user is starting to edit the "V", while the fifth stage 1825 illustrates that the user has added a stroke to the "V", such that the device 1800 recognizes this first character as a "Y" and modifies the character in the text area 1840 of the GUI. The user could then move to the right side of the handwriting area and draw another character, which would cause the device to fade out the display of the "Y".

Figure 19:
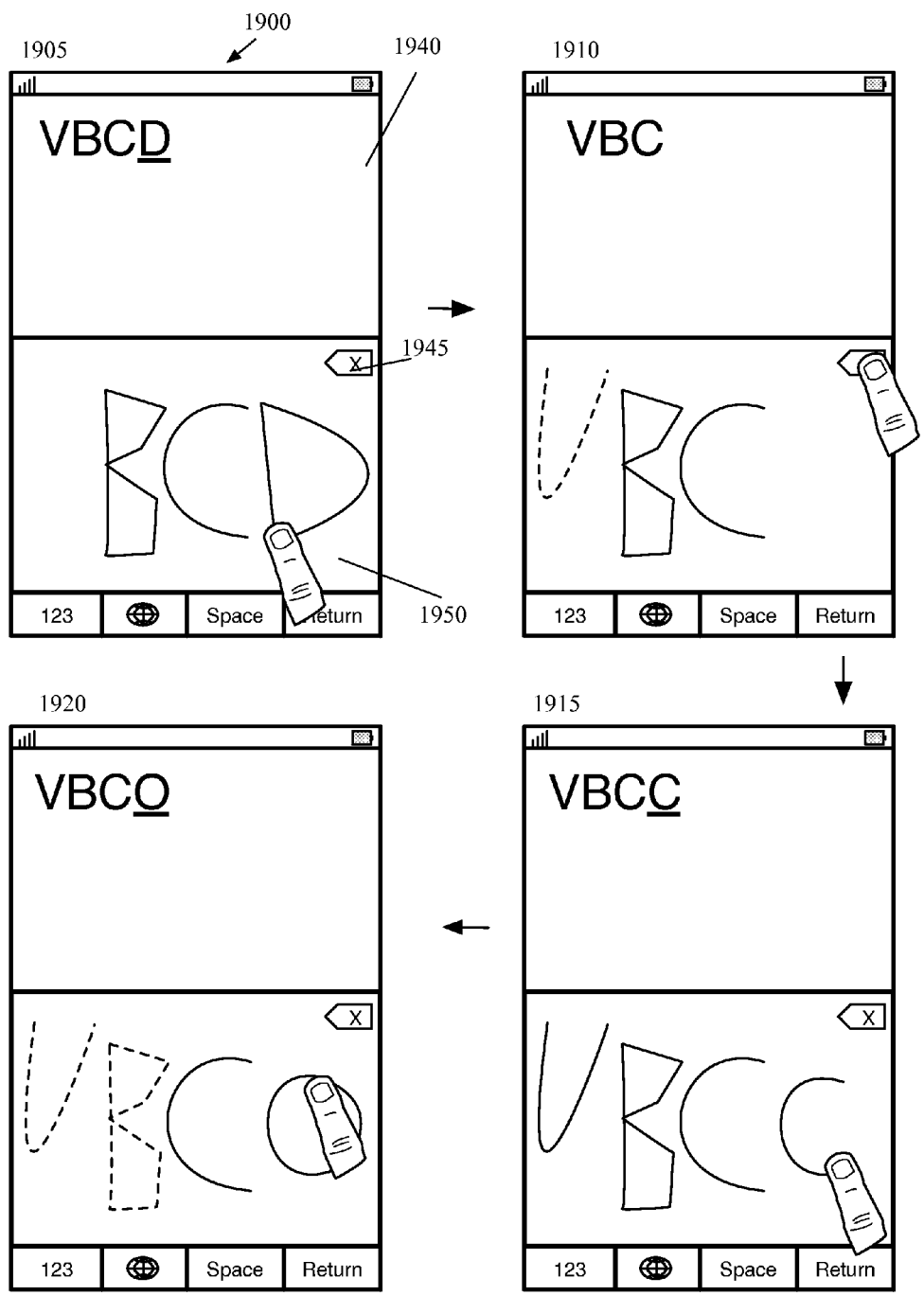
FIG. 19 illustrates a character deletion selectable item for modifying a last input character.

In some cases, rather than using the delete key (or other corresponding input mechanism) to return to previously-removed or faded characters, users may use such a selectable item in order to erase the current character and start over drawing that character. FIG. 19 illustrates four stages 1905-1920 in which a user uses a character deletion selectable item 1945 (i.e., a delete key) in order to modify the last input character.

The first stage 1905 illustrates the user providing handwritten input in the handwriting area 1950. In particular, the user is about the complete the letter "D", which has been recognized by the device 1900 and thus displayed in the text area 1940. The handwriting area 1950 currently only displays the letters "C" and "D" while the text area 1940 indicates that the user has entered the text "VBCD".

As shown at the first stage 1905, the user is currently in the process of completing the drawing of a fourth character "D", having previously drawn the characters "VBC" (as identified in the text area 1940). At this juncture, the device 1900 has previously removed (e.g., by fading out) the letter "V" from the handwriting area 1950 (e.g., using a two-character buffer between the removed character and the currently-drawn character).

The second stage 1910 illustrates the user selecting the delete key 1945 (e.g., using a tap input over this selectable item). As in the previous example, this causes the device 1900 to remove the input for the "D" and re-display the input for the "V" in the handwriting area 1950. The device 1900 also removes the "D" from the text area 1940 that keeps track of the input text in the stage.

In the third stage 1915, the user begins providing input for a new character to the right of the previously-input "C" in the handwriting area 1940. At this juncture, the device 1900 recognizes this newly input character as another "C", and displays the recognized character in the text area 1940. However, as shown in the fourth stage 1920, the user continues this stroke, which causes the device 1900 to recognize the newly input character as a "O", and display this in the text area 1940.

Figure 20:
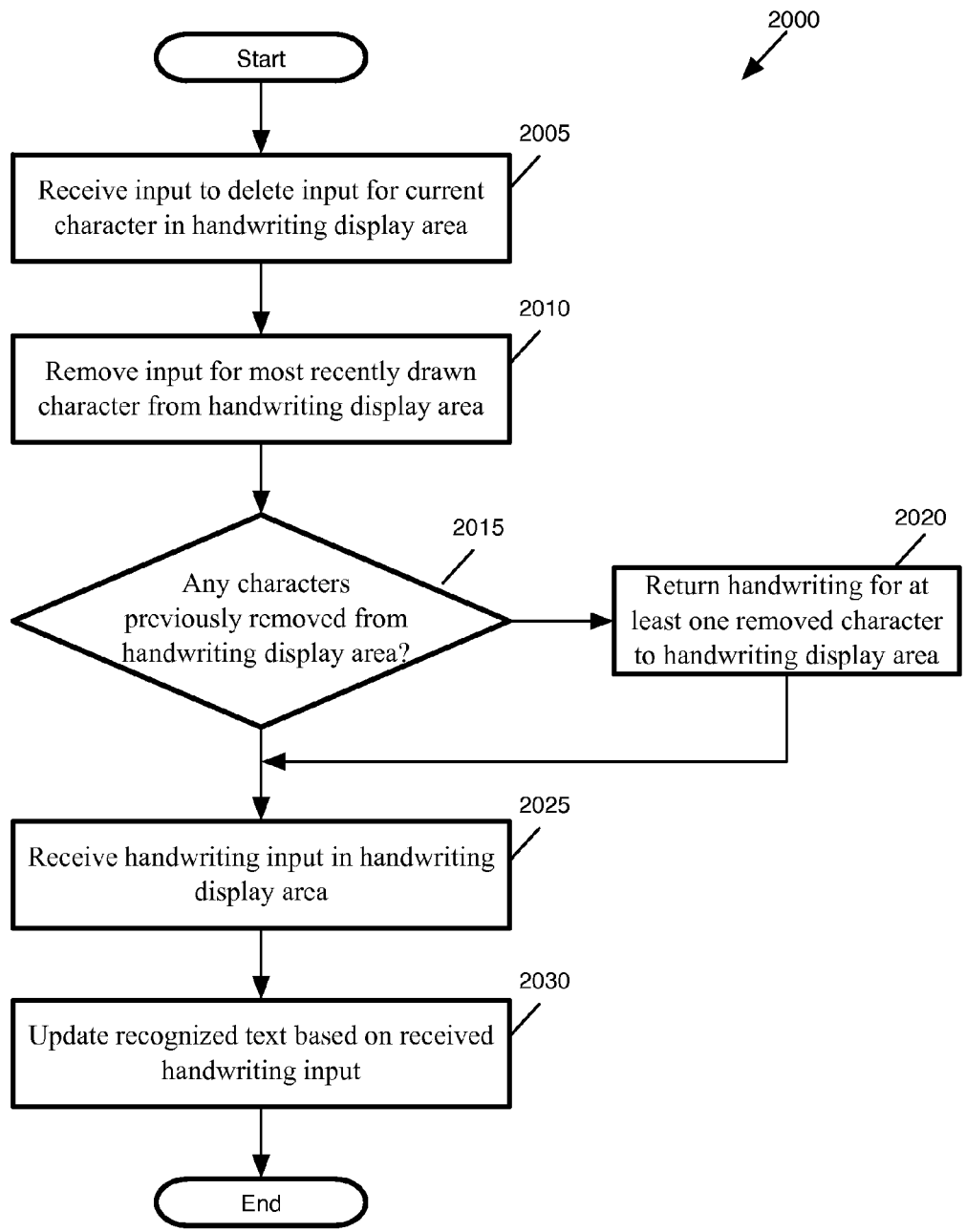
FIG. 20 conceptually illustrates a process of some embodiments for editing handwriting input using a selectable backspace/delete item.

FIG. 20 conceptually illustrates a process 2000 of some embodiments for editing handwriting input using a selectable backspace/delete item, or similar input. In some embodiments, the process is performed by the device on which the handwriting is received (e.g., by an operating system of the device, an application or other software of the device, firmware of the device, etc.).

As shown, the process begins by receiving (at 2005) input to delete input for a current character in the handwriting display area. This input may be the selection (e.g., with tap or other input on a touch sensitive or near-touch sensitive display device) of a selectable item representing the backspace or delete key. Other embodiments may allow for other input, such as gestural input within the handwriting area (e.g., a particular multi-touch gesture might be used to represent the backspace operation).

Upon receiving this input, the process 2000 removes (at 2010) the input for the most recently drawn character from the handwriting display area. This requires the device (e.g., the operating system, application, etc. performing the process) to determine whether the most recent input is a new character or is part of a previous character. That is, the device determines which handwriting input strokes constitute the most recent character, and which strokes are part of other characters. In many cases, this is apparent, but in cases such as that shown in FIG. 7, the device must rely on its calculated probabilities to determine the user intent of a given stroke. Once the device ascertains the boundaries of the character to delete, the device removes this input from the handwriting area and any recognized input for the character from the text area.

In addition, the process 2000 determines (at 2010) whether any characters have previously removed from the handwriting display area. The user might provide the delete input to the device while drawing one of the first characters, before the device has removed any of the handwriting input for any characters.

When at least one character has been removed, the process returns (at 2015) the handwriting input for a set of characters to the handwriting display area. In some embodiments, the application uses an N-character buffer for determining when to remove character input, as described above. In some such embodiments, the application will return the input for the single most-recently removed character to the handwriting display area. In other embodiments, depending on the techniques used to determine when to remove characters, the device might return multiple characters to the handwriting display area (e.g., for embodiments that use location-threshold based removal).

Next, the process receives (at 2025) handwriting input in the handwriting display area. One of ordinary skill in the art will recognize that, in some embodiments, the operation 2025 does not flow directly from the operations 2005-2020. That is, when a user selects the delete key selectable item (or equivalent input is received), the device automatically performs operations 2005-2020. The software handling the handwriting input then sits in a wait state, awaiting further input in the handwriting display area (or other input, such as the selection of a return or space key selectable item, etc.). For illustration purposes, however, the process 2000 is shown as a single process, which would often take place when a user selects the delete key item. The received handwriting input, in some embodiments, may be a touch input on a touch sensitive display of the device or input from a stylus, etc. In some embodiments, the input is received in a specific region of the touch sensitive screen, identified as a handwriting input area in the graphical user interface displayed on the screen. In addition, some embodiments receive input through a touchpad/trackpad (with touch input or a stylus), rather than through a touchscreen.

Based on the received handwriting input, the device updates (at 2030) the recognized text (e.g., in the text area). In some embodiments, this operation entails (i) determining the character that the user is updating and (ii) performing automatic text recognition for that character. The user might be updating a previously-drawn character (as in the example of FIG. 17) or re-drawing a new character (as in the example of FIG. 19). In either case, the device of some embodiments performs the process 600, or a similar process, in order to determine the best match for the newly updated character (i.e., by calculating probabilities for various possible characters).

Figure 21:
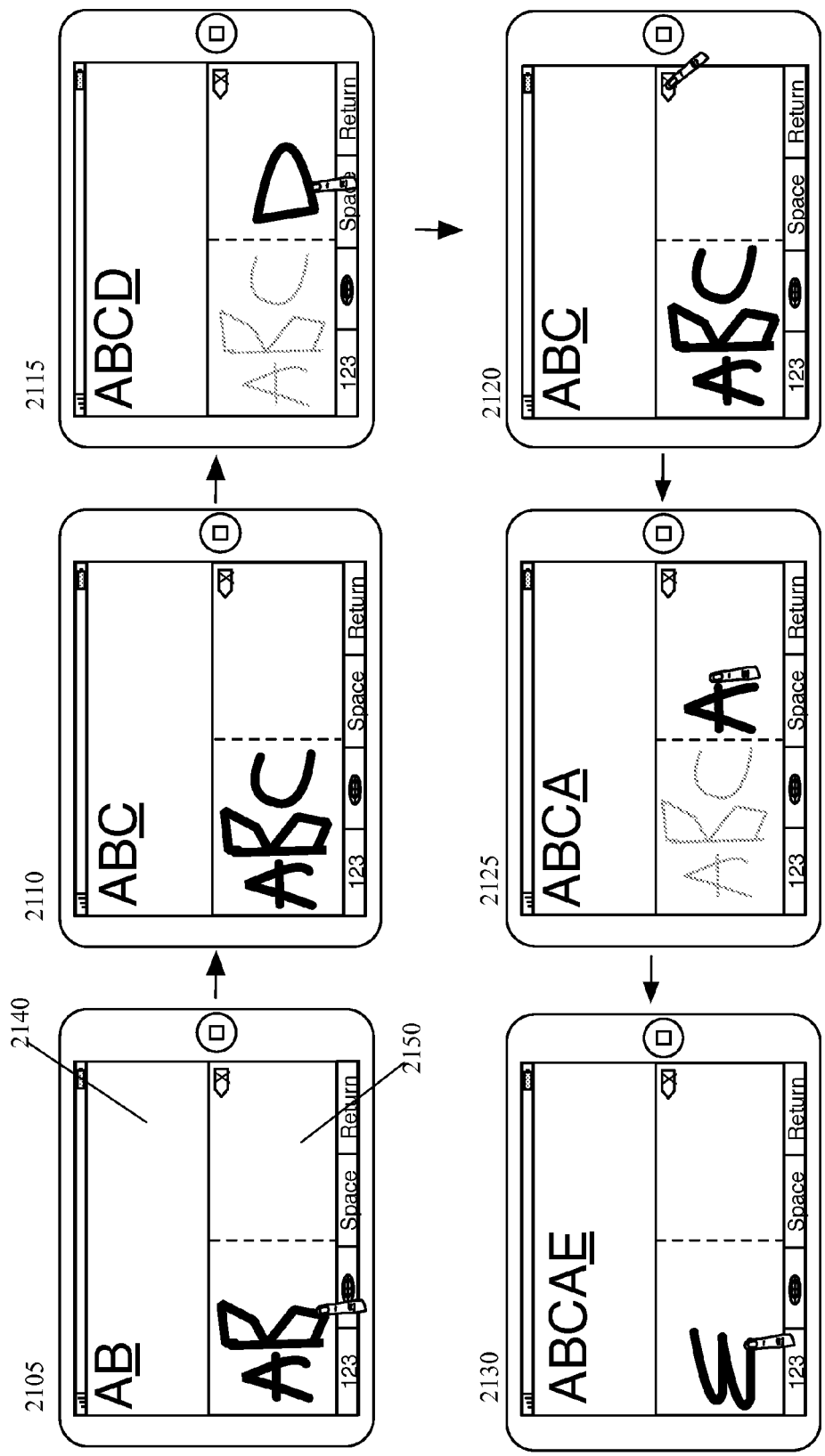
FIG. 21 illustrates the use of a backspace/delete selectable item in a GUI in which the a position threshold determines when to fade out previously written characters FIG. 22 conceptually illustrates a software architecture of a handwriting recognition system of some embodiments.

FIG. 21 illustrates the use of a backspace/delete selectable item 2135 in a GUI in which the a position threshold determines when to fade out previously written characters, over six stages 2105-2130 of a device 2100. Specifically, in this example, once the handwriting input passes a threshold in the middle of the handwriting area 2150, the left side is grayed out. The user then selects the backspace item to remove the text from the right side of the handwriting area and bring back the fully-displayed text on the left side. After continuing to use the right side of the handwriting area, additional input starting over on the left side of the area causes the removal of all of the previously-drawn characters from the handwriting area.

As shown at stage 2105, the user has finished drawing a second character "B", which the device has recognized at this point. The user continues in the second stage 2110, having drawn a third character "C" such that the input reads "ABC" in the text area 2140. Both of these stages indicate a threshold position 2145 at the center of the handwriting area; as in FIG. 13 above, this position is not actually displayed within the handwriting area in some embodiments, but rather is shown in this figure to indicate a threshold position in the display area.

The third stage 2115 illustrates that the user has drawn a fourth character "D" in the handwriting display area 2150. This character is drawn to the right of the threshold position 2145, and as a result the device has grayed out the characters on the left side of the handwriting display area. Some embodiments gray out the left side of the display area as soon as the first stroke crosses the threshold position, with all characters completely to the left of the threshold position grayed out (and any characters that straddle the threshold position left editable). In other embodiments, the device does not gray out the characters to the left of the threshold position until a new character is clearly drawn completely to the right of the threshold. In some such embodiments, the device grays out any characters that straddle the threshold while in other such embodiments, the device leaves such straddling characters editable.

The fourth stage 2120 illustrates the user having selected the backspace item 2135. As a result, the device deletes the fourth character "D" and returns the first three characters to the left of the threshold position 2145 to full display (i.e., editable and not grayed out). Had the user first drawn a fifth character after the "D", some embodiments would have only removed this fifth character (leaving the GUI in the state shown in the third stage 2115), while other embodiments would have removed all of the characters to the right of the threshold position (leaving the GUI in the state shown in the fourth stage 2120).

The fifth stage 2125 illustrates that when the user resumes drawing characters to the right of the threshold position 2145, the device again grays out the characters drawn to the left of the threshold position, as in the previous stage 2115. In this case, the user has drawn an "A" as the fourth character rather than the "D". In the fifth stage, the user returns back to the beginning of the handwriting area 2150, drawing an "E" on the far left side of the display area. In this case, the device removes all of the previously-drawn characters from the handwriting area 2150 once the user returns to the start of the area. As shown in the text area 2140, the text input is continuous, as the input text now reads "ABCAE", keeping all of the characters drawn the first time through the handwriting area. This allows the user to continuously input handwriting from left to right, starting over each time the right edge is reached.

The above examples illustrate a GUI with several additional selectable items. For instance, the GUI of the device 100 in FIG. 1 includes four selectable items located below the handwriting area 150. These selectable items are a number keyboard item 155, a keyboard switch item 160, a space insertion item 165, and a line break ("return") insertion item 170. In some embodiments, the number keyboard item 155 enables the user to switch from providing input via handwriting in the handwriting display area 150 to providing input via a touchscreen keyboard for numbers (e.g., "1", "2", etc.), punctuation (e.g., "?", ".", etc.) and other symbols (e.g., "@", "$", etc.).

The keyboard switch item 160 allows the user to either switch to a previous character input mechanism or select between several character input mechanisms. Different character input mechanisms may include different touchscreen keyboards and accompanying auto-correction/auto-completion dictionaries (e.g., an English keyboard, French keyboard, Russian keyboard, etc.), as well as different character recognition corpuses with accompanying autocomplete dictionaries for handwriting input (e.g., Chinese, English, etc.). In some embodiments, a first type of input (e.g., tap input) causes the device to switch to a most recently used keyboard while a second type of input (e.g., press and hold) causes the device to present the user with a list of keyboards that the user can then select.

The space insertion item 165 allows the user to insert a space (e.g., between words) into the recognized text, while the line break insertion item 170 allows the user to insert a line break (a return) into the recognized text. (e.g., between paragraphs). In some embodiments, these functionalities may be activated using gestures rather than the selectable items. For instance, the device might accept certain gestures in the handwriting area to add a space, delete a character, or add a line break. In some embodiments, the gestures are pre-defined such that they are easily distinguishable by the device from character strokes. In some embodiments, the touch-sensitive display is a multi-touch sensitive display, and the gestures are multi-touch gestures.

Figure 22:
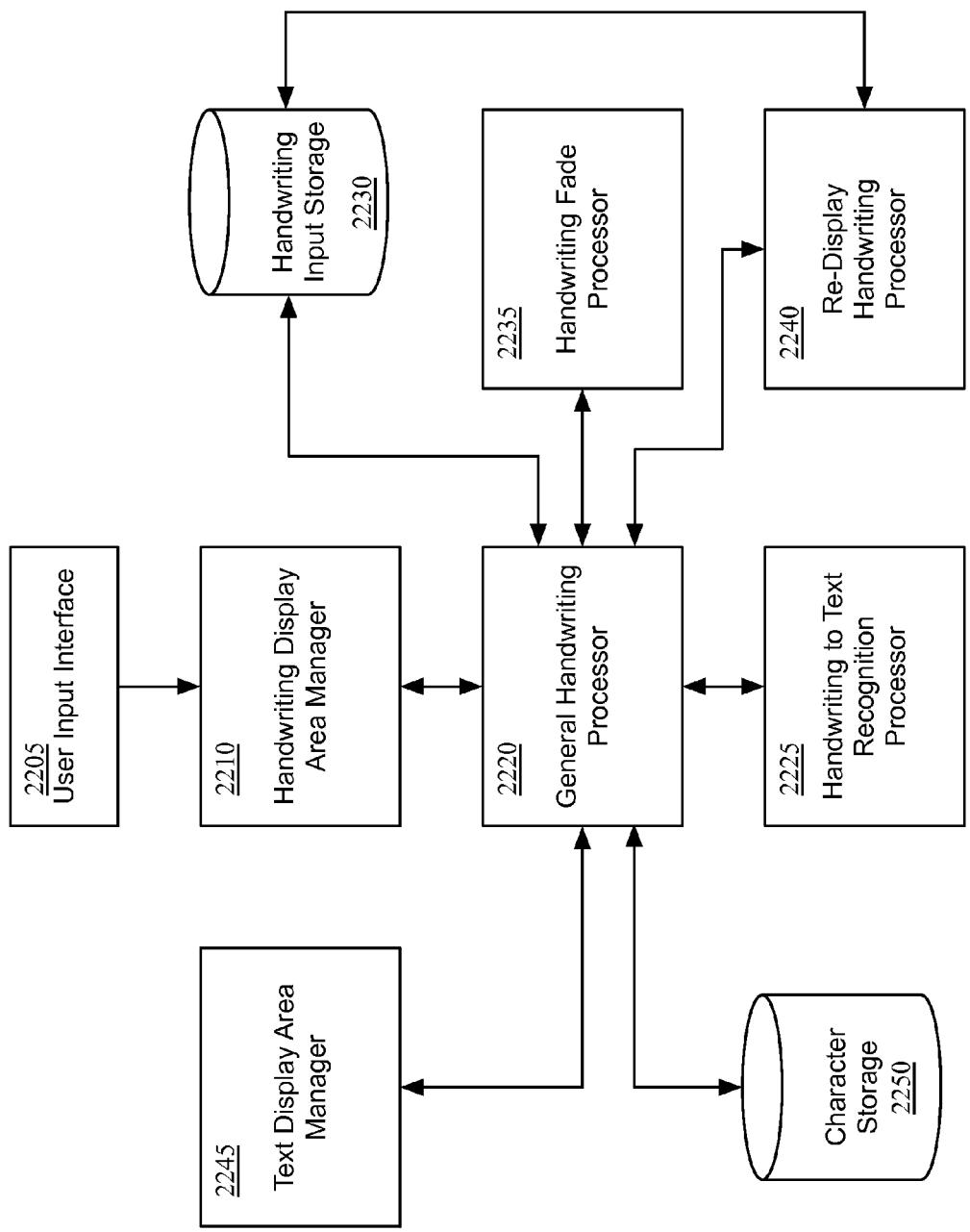

FIG. 22 conceptually illustrates a software architecture of a handwriting recognition system 2200 of some embodiments. The handwriting recognition system 2200 includes a user input interface 2205, a handwriting display area manager 2210, a general handwriting processor 2220, a handwriting to text recognition processor 2225, a handwriting storage 2230, a handwriting fade processor 2235, a re-display handwriting processor 2240, a text area 2245 and a character storage 2250. The handwriting recognition system 2200 is integrated into the operating system of a touchscreen device in some embodiments, while in other embodiments it is an application or part of an application that runs on top of the operating system of the device. With respect to the description of FIG. 22, one of ordinary skill in the art will recognize that the term "processor" refers to the different software modules of the handwriting recognition system 2200, rather than to individual hardware processing units (although the various processors 2220, 2225, 2235, and 2240 may be executed by such hardware processing units).

The user input interface 2205 receives a user's handwritten input from a touch screen of a device on which the system operates (or from a touchpad/trackpad or similar input mechanism). In some embodiments, the input interface 2205 detects touch input on the screen of the device and determines the corresponding handwritten input that is being input based on various sensors of the screen. In some embodiments, this functionality is split between a touchscreen controller that detects pressure and location on the screen, and an operating system multi-touch recognition module that translates this pressure and location data into gesture (e.g., multi-touch gesture) data (i.e., by recognizing strokes, sweep gestures, tap input, etc.).

When the data locations correspond to the bounds of a displayed handwriting display area, the user input interface 2205 sends the input to the handwriting display area manager 2210. The handwriting display area manager 2210, in some embodiments, determines whether the input corresponds to handwriting input for drawing characters (as opposed to multi-touch gestures, or tap input to select an item (e.g., the delete item, space or return items, auto-complete items, etc.).

When the input corresponds to handwriting input, the handwriting display area manager 2210 displays the input within the display area. In addition, the handwriting display area provides this input to the general handwriting processor 2220.

The general handwriting processor 2220 facilitates the various different functionalities of the handwriting input system 2200, including the display of corresponding text characters for a handwritten input in a text display area, the removal of characters from the handwriting display area 2210 (e.g., by fading out the character), and the re-displaying of previously removed characters in the handwriting display area. In particular, the general handwriting processor 2220 communicates in some embodiments with the handwriting display area manager 2210 to receive data regarding the user's handwritten input that has been input on the device. In other embodiments, the general handwriting processor 2220 receives this information directly from the user input interface, and distributes the data to the handwriting display area manager 2210 when appropriate.

The general handwriting processor 2220, upon receiving input, communicates with the various modules of the handwriting system 2200 in order to provide these modules with the data needed for them to perform their functionalities. Thus, the general handwriting processor 2220 provides the handwriting input to the text recognition processor 2225 in order for this module to recognize characters, and provides the recognized characters to the text display area manager 2245. The general handwriting processor provides handwriting input and character recognition input to the handwriting fade processor 2235, which identifies when to remove characters from the handwriting display area, and then provides these determinations to the handwriting display area manager 2210 in order for the manager 2210 to remove characters from the display. The general handwriting processor 2220 also provides information to the re-display handwriting processor 2240 upon receiving a selection of a delete item or equivalent input, in order for the re-display processor 2240 to determine whether to return any characters to the handwriting display.

The handwriting to text recognition processor 2225 receives the handwriting input data and determines characters to which the handwriting input corresponds. In some embodiments, the text recognition processor 2225 performs a process such as that shown in FIG. 6, to determine a set of possible character matches and the certainty levels for each possible character. In some embodiments, the text recognition processor 2225 relies upon a dictionary or corpus of stored character data, as well as context data and other information useful in determining a possible match. In some embodiments, the text recognition processor 2225 sends this information (the set of possible matches and determined certainty levels) to the general handwriting processor 2220.

The text display area manager 2245 receives recognized text characters from the general processor 2220 that are to be displayed within the text display area of the device on which the system 2200 operates. In some embodiments, the text display area 2245 may occupy a same screen space as the handwriting display area 2210. In other embodiments, the text display area 2245 can be a separate area or portion of the screen from the handwriting display area 2210. For instance, in some embodiments, the text display area is a display area of another application, such as an e-mail application, text messaging application, etc.

The handwriting fade processor 2235 receives the character and handwriting data from the general handwriting processor 2220 on an ongoing basis in some embodiments, and determines when to remove a character from the handwriting display area. Based on various determinations (e.g., a character buffer threshold, a time-based threshold, a location-based threshold, etc.), the handwriting fade processor 2235 determines that one or more characters should be removed from the handwriting display area, and communicates this data to the general handwriting processor 2220. This allows the general handwriting processor 2220 to instruct the handwriting display area manager 2210 to remove certain characters from the handwriting display area.

The re-display handwriting processor 2240 receives data from the general processor 2220 about the handwritten character input, and receives instructions when the system 2200 receives a delete input (e.g., via selection of a GUI item). The re-display handwriting processor 2240 of some embodiments then determines which, if any, characters should be returned to the display in the handwriting display area. In some embodiments, the re-display processor 2240 re-displays the last removed character or set of characters from the handwriting input area. The processor 2240 retrieves these characters from the handwriting input storage 2230 in some embodiments. The handwriting input storage 2230 stores a user's handwritten input. Likewise, the character storage 2250 stores the text characters recognized for the handwritten input by the text recognition processor 2225, and displayed within the text display area.

The operation of the handwriting recognition system 2200 will now be described. The user input interface 2205 continuously receives a user's handwritten input. The input interface 2205 may be a controller for a touch-sensitive display screen of the device. In some embodiments, the handwriting input is detected based on a user's touch input. In other embodiments, the handwriting input is detected from another input device such as a stylus or smart pen. The user input interface 2205 detects the handwriting input and sends this data to the handwriting display area manager 2210 for simultaneous display within the handwriting display area of the device on which the system 2200 operates. The detected handwriting input data is also and sent to the general handwriting processor 2220.

The general handwriting processor 2220 receives the handwriting input from the handwriting display area 2220 and sends this input to the handwriting to text recognition processor 2225. In some embodiments, the general processor continuously communicates with the handwriting display area manager 2210 and the handwriting to text recognition processor 2225 in order to immediately recognize the handwriting input being input by the user. The handwriting to text recognition processor 2225 determines the corresponding character or set of characters that best matches a given user's handwriting input, as well as additional possible matches, with calculated levels of certainty for each possibility. After matching the handwriting input to corresponding text characters, the text recognition processor 2225 sends this data to the general processor 2220 for further processing.

The general handwriting processor 2220 next sends the recognized text characters simultaneously to the text area manager 2245, character storage 2250, handwriting fade processor 2235, and handwriting input storage 2230. The text area manager 2245 displays the characters in the text area of the device while the character storage 2250 stores the recognized text characters. The handwriting input storage 2230 stores the handwriting input, in some embodiments storing each recognized character separately. As the input is received, the handwriting fade processor 2235 determines whether to remove any subset of the handwriting input from the handwriting display area 2210 in order to enable the user to continue to provide handwriting input. The handwriting fade processor 2235 may determine to remove (e.g., fade) a particular portion (or the entirety) of the handwriting input based on the different factors described above, including using any one of, or combination of character thresholds, location thresholds, timer based thresholds, word recognition, etc. Based on the various factors, the handwriting fade processor 2235 compares the handwriting input and the recognized characters for the handwriting input to the particular thresholds to determine whether or not to remove a subset of the handwriting input. The handwriting fade processor 2235 communicates with the general handwriting processor 2220 in order to remove handwritten input from the handwriting display area.

Furthermore, when a user submits input for deleting or editing characters (either in the text area or the handwriting display area), the general handwriting processor 2220 notifies the re-display handwriting processor 2240 in order to (i) delete the last received handwriting input corresponding to a character from the handwriting area and (ii) retrieve, from the handwriting input storage 2230, handwriting input corresponding to a set of characters that need to be re-displayed in the handwriting area. In some embodiments, the re-display processor 2240 retrieves as many handwritten characters as will fit within the display area of the device. In other embodiments, the re-display processor retrieves the last character or set of characters that were removed from the handwriting display area 2210. The user may then edit these re-displayed characters and/or add new characters, which are then detected by the user input interface 2205.

Many of the above-described features and applications are implemented as software processes (e.g., applications, daemons, library functions called by an application, etc.) that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic or solid-state storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
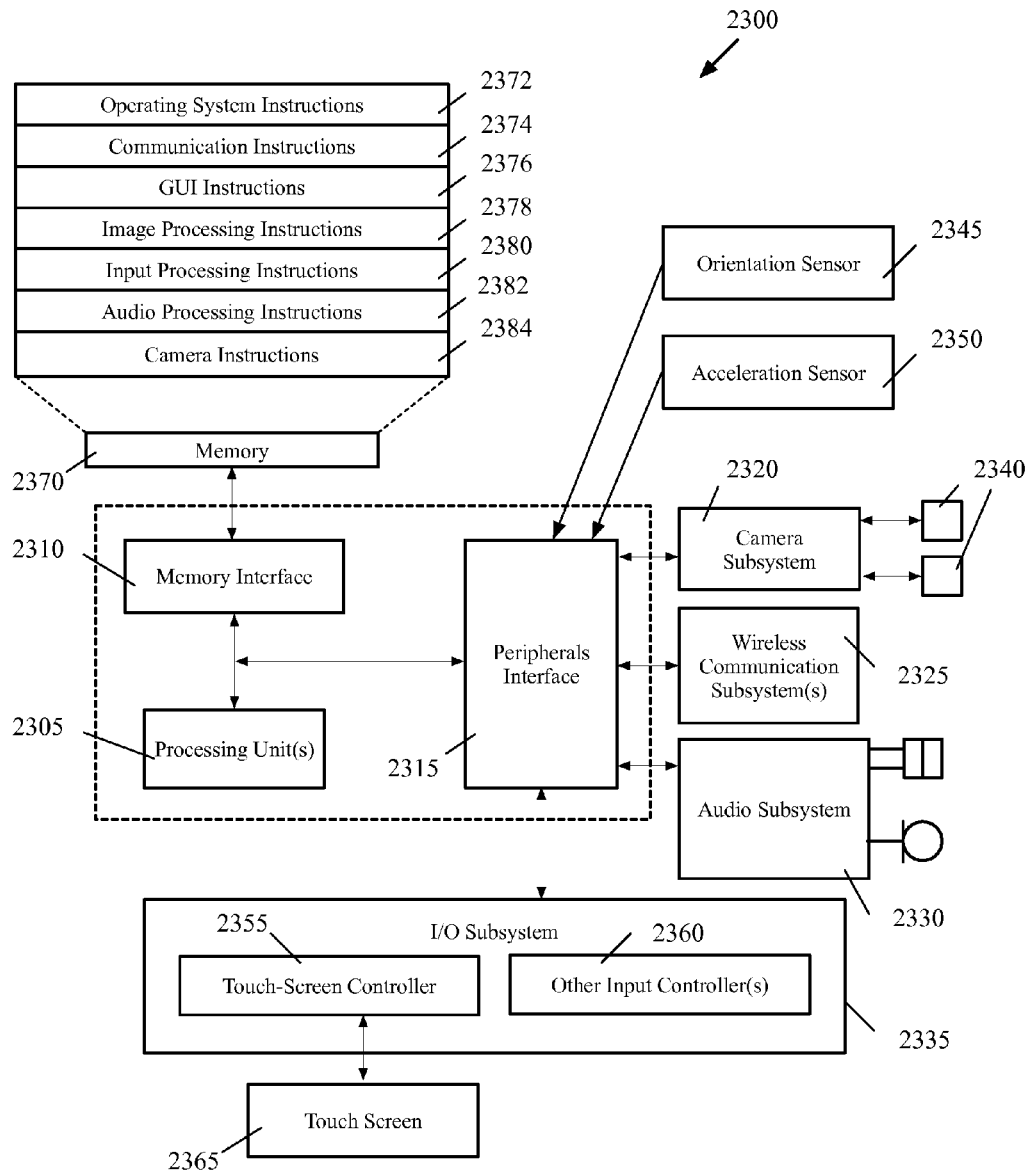
FIG. 23 an example of an architecture of a mobile computing device.

The handwriting input of some embodiments operate on mobile devices, such as smart phones (e.g., iPhones®) and tablets (e.g., iPads®). FIG. 23 is an example of an architecture 2300 of such a mobile computing device. Examples of mobile computing devices include smartphones, tablets, laptops, etc. As shown, the mobile computing device 2300 includes one or more processing units 2305, a memory interface 2310 and a peripherals interface 2315.

The peripherals interface 2315 is coupled to various sensors and subsystems, including a camera subsystem 2320, a wireless communication subsystem(s) 2325, an audio subsystem 2330, an I/O subsystem 2335, etc. The peripherals interface 2315 enables communication between the processing units 2305 and various peripherals. For example, an orientation sensor 2345 (e.g., a gyroscope) and an acceleration sensor 2350 (e.g., an accelerometer) is coupled to the peripherals interface 2315 to facilitate orientation and acceleration functions.

The camera subsystem 2320 is coupled to one or more optical sensors 2340 (e.g., a charged coupled device (CCD) optical sensor, a complementary metal-oxide-semiconductor (CMOS) optical sensor, etc.). The camera subsystem 2320 coupled with the optical sensors 2340 facilitates camera functions, such as image and/or video data capturing. The wireless communication subsystem 2325 serves to facilitate communication functions. In some embodiments, the wireless communication subsystem 2325 includes radio frequency receivers and transmitters, and optical receivers and transmitters (not shown in FIG. 23). These receivers and transmitters of some embodiments are implemented to operate over one or more communication networks such as a GSM network, a Wi-Fi network, a Bluetooth network, etc. The audio subsystem 2330 is coupled to a speaker to output audio (e.g., to output voice navigation instructions). Additionally, the audio subsystem 2330 is coupled to a microphone to facilitate voice-enabled functions, such as voice recognition (e.g., for searching), digital recording, etc.

The I/O subsystem 2335 involves the transfer between input/output peripheral devices, such as a display, a touch screen, etc., and the data bus of the processing units 2305 through the peripherals interface 2315. The I/O subsystem 2335 includes a touch-screen controller 2355 and other input controllers 2360 to facilitate the transfer between input/output peripheral devices and the data bus of the processing units 2305. As shown, the touch-screen controller 2355 is coupled to a touch screen 2365. The touch-screen controller 2355 detects contact and movement on the touch screen 2365 using any of multiple touch sensitivity technologies. The other input controllers 2360 are coupled to other input/control devices, such as one or more buttons. Some embodiments include a near-touch sensitive screen and a corresponding controller that can detect near-touch interactions instead of or in addition to touch interactions.

The memory interface 2310 is coupled to memory 2370. In some embodiments, the memory 2370 includes volatile memory (e.g., high-speed random access memory), non-volatile memory (e.g., flash memory), a combination of volatile and non-volatile memory, and/or any other type of memory. As illustrated in FIG. 23, the memory 2370 stores an operating system (OS) 2372. The OS 2372 includes instructions for handling basic system services and for performing hardware dependent tasks.

The memory 2370 also includes communication instructions 2374 to facilitate communicating with one or more additional devices; graphical user interface instructions 2376 to facilitate graphic user interface processing; image processing instructions 2378 to facilitate image-related processing and functions; input processing instructions 2380 to facilitate input-related (e.g., touch input) processes and functions; audio processing instructions 2382 to facilitate audio-related processes and functions; and camera instructions 2384 to facilitate camera-related processes and functions. The instructions described above are merely exemplary and the memory 2370 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 23 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 23 may be split into two or more integrated circuits.

Figure 24:
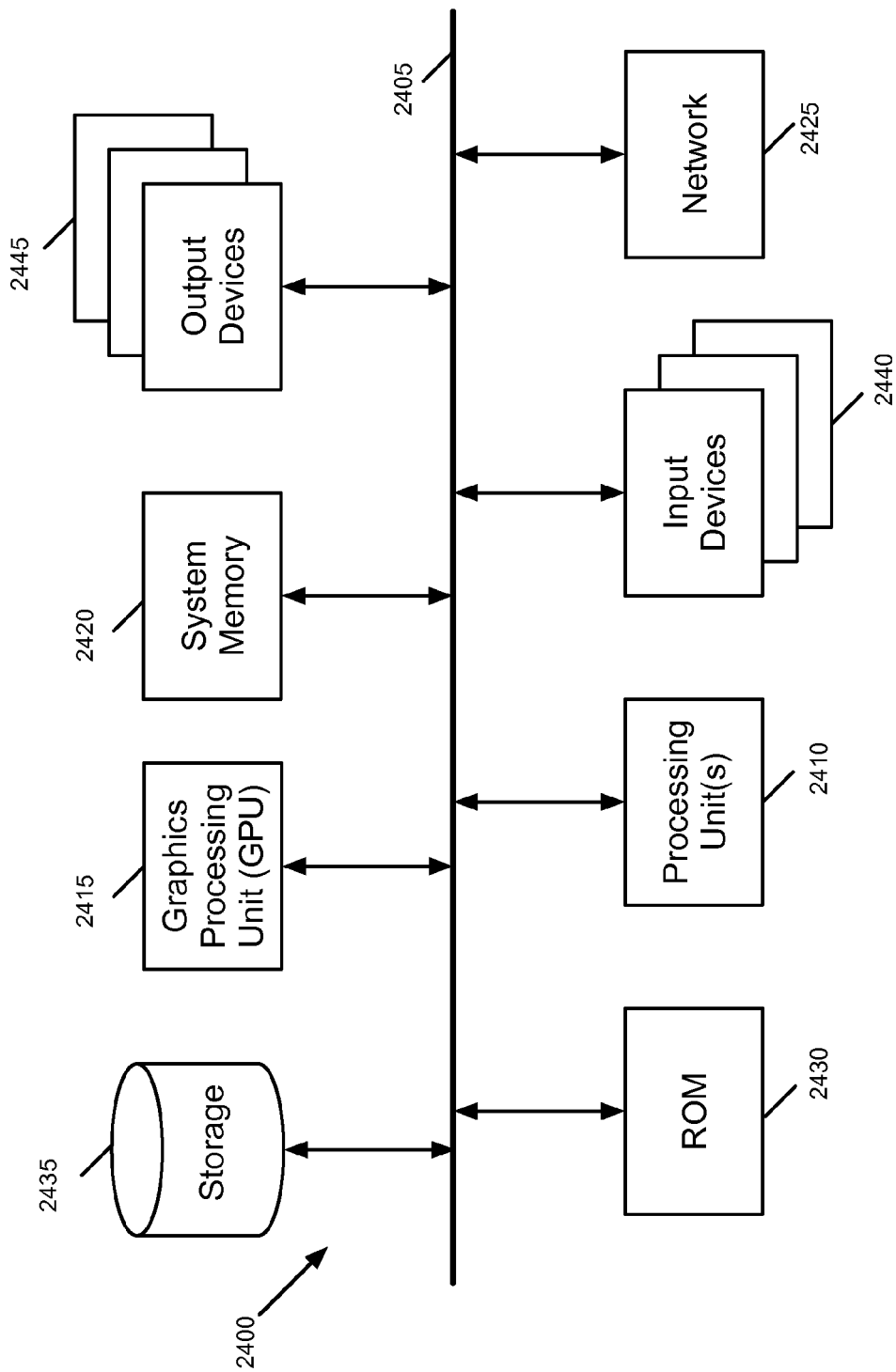
FIG. 24 conceptually illustrates an electronic system with which some embodiments of the invention are implemented.

FIG. 24 conceptually illustrates another example of an electronic system 2400 with which some embodiments of the invention are implemented. The electronic system 2400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410. In some embodiments, such functionality can be provided using CoreImage's kernel shading language.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive, integrated flash memory) as the permanent storage device 2435.

Other embodiments use a removable storage device (such as a floppy disk, flash memory device, etc., and its corresponding drive) as the permanent storage device. Like the permanent storage device 2435, the system memory 2420 is a read-and-write memory device. However, unlike storage device 2435, the system memory 2420 is a volatile read-and-write memory, such a random access memory. The system memory 2420 stores some of the instructions and data that the processor needs at runtime. In some embodiments, the invention's processes are stored in the system memory 2420, the permanent storage device 2435, and/or the read-only memory 2430. For example, the various memory units include instructions for processing multimedia clips in accordance with some embodiments. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"), cameras (e.g., webcams), microphones or similar devices for receiving voice commands, etc. The output devices 2445 display images generated by the electronic system or otherwise output data. The output devices 2445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet), or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes (e.g., FIGS. 6, 11, and 20). The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A non-transitory machine readable medium storing a program for execution by an electronic device with at least one processing unit, a display, and a touch-sensitive input device, the program comprising instructions, which when executed by the electronic device, cause the electronic device to:
   receive handwritten input via the touch-sensitive input device;
   detect a set of text characters that correspond to the handwritten input;
   display the handwritten input in a handwriting area on the display;
   display the set of detected text characters in a text area of the display;
   receive an input to delete a character; and,
   in response to receiving the input to delete a character;
      delete a last detected text character in the text area of the display while maintaining display of one or more other detected text characters in the text area of the display; and
      delete, in the handwriting area of the display, handwritten input that corresponds to the last detected text character in the text area of the display while maintaining display of handwritten input that corresponds to one or more other text characters in the text area of the display, wherein deleting, in the handwriting area of the display, the handwritten input corresponds to the last detected text character in the text area of the display while maintaining display of the handwritten input that corresponds to one or more other text characters in the text area of the display comprises fading out the handwritten input from the handwriting area that corresponds to the last detected text character in the text area of the display.

2. The non-transitory machine readable medium of claim 1, including instructions, which when executed by the electronic device, cause the electronic device to:
present one or more candidate text characters for the handwritten input;
receive an input selecting one of the one or more candidate text characters; and
display the selected candidate text character in the set of text characters in the text area.

3. The non-transitory machine readable medium of claim 1, wherein the handwritten input comprises handwritten characters, including instructions, which when executed by the electronic device, cause the electronic device to:
detect that a number of handwritten characters displayed in the handwriting area exceeds a threshold number of characters; and
partially fade out a subset of the handwritten characters when the number of handwritten characters exceeds the threshold.

4. The non-transitory machine readable medium of claim 1, wherein the handwritten input comprises handwritten characters, including instructions, which when executed by the electronic device, cause the electronic device to:
detect that a subset of the handwritten characters have been displayed in the handwriting area for a particular time period; and
partially fade out the subset of the handwritten characters when the particular time period exceeds a threshold.

5. The non-transitory machine readable medium of claim 1, including instructions, which when executed by the electronic device, cause the electronic device to:
detect that the handwritten input exceeds a threshold location in the handwriting area; and
partially fade out the handwritten input.

6. The non-transitory machine readable medium of claim 1, wherein the electronic display is a touch-sensitive display and the handwritten input is received through the handwriting area on the touch-sensitive display.

7. The non-transitory machine readable medium of claim 1, wherein the touch-sensitive input device is a trackpad that maps its positions to positions in the handwriting area.

8. The non-transitory machine readable medium of claim 1, including instructions, which when executed by the electronic device, cause the electronic device to:
receive a subsequent handwritten input over the handwritten input displayed in the handwriting area of the display; and
clearing the partially faded out handwritten input in the handwriting area of the display.

9. The non-transitory machine readable medium of claim 1, including instructions, which when executed by the electronic device, cause the electronic device to:
receive input to edit the handwriting input; and
when a particular subset of the handwritten input has been modified within the handwriting area, update a subset of the set of characters that corresponds to the particular subset of the handwritten input in the text area.

10. A computing device, comprising:
a display;
a touch-sensitive input device;
one or more processors; and
memory storing one or more programs for execution by the one or more processors, the one or more programs including instructions for:
receiving handwritten input via the touch-sensitive input device;
detecting a set of text characters that correspond to the handwritten input;
displaying the handwritten input in a handwriting area on the display;
displaying the set of detected text characters in a text area of the display;
receiving an input to delete a character; and,
in response to receiving the input to delete a character;
deleting a last detected text character in the text area of the display while maintaining display of one or more detected text characters in the text area of the display; and
deleting, in the handwriting area of the display, handwritten input that corresponds to the last detected text character in the text area of the display while maintaining display of handwritten input that corresponds to one or more other text characters in the text area of the display, wherein deleting, in the handwriting area of the display, the handwritten input corresponds to the last detected text character in the text area of the display while maintaining display of the handwritten input that corresponds to one or more other text characters in the text area of the display comprises fading out the handwritten input from the handwriting area that corresponds to the last detected text character in the text area of the display.

11. The computing device of claim 10, wherein the handwritten input comprises handwritten characters, wherein the one or more programs including instructions for:
detecting that a number of handwritten characters displayed in the handwriting area exceeds a threshold number of characters; and
partially fading out a subset of the handwritten characters when the number of handwritten characters exceeds the threshold.

12. The computing device of claim 10, including instructions for:
detecting that the handwritten input exceeds a threshold location in the handwriting area; and
partially fading out the handwritten input.

13. The computing device of claim 10, wherein the one or more programs include instructions for:
receiving input to edit the handwriting input;
when a particular subset of the handwritten input has been modified within the handwriting area, updating a subset of the set of characters that corresponds to the particular subset of the handwritten input in the text area.

14. A method comprising: at a computing device with a display and a touch-sensitive input device;
receiving handwritten input via the touch-sensitive input device;
detecting a set of text characters that correspond to the handwritten input;
displaying the handwritten input in a handwriting area on the display;
displaying the set of detected text characters in a text area of the display;
receiving an input to delete a character; and
in response to receiving the input to delete a character:
deleting a last detected text character in the text area of the display while maintaining display of one or more detected text characters in the text area of the display; and
deleting, in the handwriting area of the display, handwritten input that corresponds to the last detected text character in the text area of the display while maintaining display of handwritten input that corresponds to one or more other text characters in the text area of the display, wherein deleting, in the handwriting area of the display, the handwritten input corresponds to the last detected text character in the text area of the display while maintaining display of the handwritten input that corresponds to one or more other text characters in the text area of the display comprises fading out the handwritten input from the handwriting area that corresponds to the last detected text character in the text area of the display.

15. The method of claim 14 further comprising:
presenting one or more candidate text characters for the handwritten input;
receiving an input selecting one of the one or more candidate text characters; and
displaying the selected candidate text character in the set of text characters in the text area.

16. The method of claim 14, wherein the handwritten input comprises handwritten characters, and the method includes:
detecting that a number of handwritten characters displayed in the handwriting area exceeds a threshold number of characters; and
removing a subset of the handwritten characters when the number of handwritten characters exceeds the threshold.

17. The method of claim 14, wherein the handwritten input comprises handwritten characters, and the method includes:
detecting that a subset of the handwritten characters have been displayed in the handwriting area for a particular time period; and
partially fading out the subset of the handwritten characters when the particular time period exceeds a threshold.

18. The method of claim 14, including:
detecting that the handwritten input exceeds a threshold location in the handwriting area; and
partially fading out the handwritten input.

19. The method of claim 14, including:
receiving input to edit the handwriting input; and
when a subset of the handwritten input has been removed from the handwriting area, updating a subset of the set of characters that corresponds to the subset of the handwritten input in the text area.

20. The non-transitory machine readable medium of claim 1, including instructions, which when executed by the electronic device, cause the electronic device to:
prior to receiving the input to delete the character, ceasing to display a subset of the handwritten input within the handwriting area; and,
in response to receiving the input to delete the character:
redisplay, in the handwriting area of the display, a portion of the handwritten input that had ceased to be displayed in the handwriting area.

21. The non-transitory machine readable medium of claim 20, wherein the subset of the handwritten input within the handwriting area ceases to be displayed when an amount of handwritten input within the handwriting area exceeds a character-based, timer-based, and/or location-based threshold.

22. The non-transitory machine readable medium of claim 20, including instructions, which when executed by the electronic device, cause the electronic device to:
after redisplaying the portion of the handwritten input, detect an input to edit the redisplayed portion of the handwritten input; and,
in response to detecting the input to edit the redisplayed portion of the handwritten input, modify the redisplayed portion of the handwritten input.

23. The non-transitory machine readable medium of claim 20, wherein modifying the redisplayed portion of the handwritten input causes a previously recognized character to be changed to a different character.

* * * * *